(12) United States Patent
Kakaiya et al.

(10) Patent No.: US 11,372,787 B2
(45) Date of Patent: Jun. 28, 2022

(54) UNIFIED ADDRESS SPACE FOR MULTIPLE LINKS

(71) Applicant: Intel Corporation, Santa Clara, CA (US)

(72) Inventors: Utkarsh Kakaiya, Folsom, CA (US); Nagabhushan Chitlur, Portland, OR (US); Rajesh M. Sankaran, Portland, OR (US); Mohan Nair, Portland, OR (US); Pratik M. Marolia, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 1017 days.

(21) Appl. No.: 15/836,854

(22) Filed: Dec. 9, 2017

(65) Prior Publication Data

US 2019/0034367 A1  Jan. 31, 2019

(51) Int. Cl.
| | |
|---|---|
| *G06F 13/20* | (2006.01) |
| *G06F 13/40* | (2006.01) |
| *G06F 13/42* | (2006.01) |
| *G06F 12/10* | (2016.01) |
| *G06F 12/1036* | (2016.01) |

(52) U.S. Cl.
CPC .............. *G06F 13/20* (2013.01); *G06F 12/10* (2013.01); *G06F 12/1036* (2013.01); *G06F 13/404* (2013.01); *G06F 13/4068* (2013.01); *G06F 13/4221* (2013.01); *G06F 13/4295* (2013.01); *G06F 2213/0026* (2013.01); *G06F 2213/0052* (2013.01)

(58) Field of Classification Search
CPC .......... G06F 13/20; G06F 2009/45583; G06F 12/1009; G06F 12/1027; G06F 12/1036
USPC ......................................................... 711/209
See application file for complete search history.

(56) References Cited

U.S. PATENT DOCUMENTS

| | | | |
|---|---|---|---|
| 7,315,900 B1 * | 1/2008 | Ofelt ................... | H04L 47/6215 709/238 |
| 2006/0069899 A1 * | 3/2006 | Schoinas ............... | G06F 12/109 711/206 |
| 2006/0075285 A1 * | 4/2006 | Madukkarumukumana ................ G06F 11/0793 714/5.11 |
| 2006/0171303 A1 * | 8/2006 | Kashyap ................ | H04L 47/125 370/228 |
| 2008/0133875 A1 * | 6/2008 | Cohen ................. | G06F 12/1027 711/207 |
| 2010/0250821 A1 * | 9/2010 | Mueller ................ | G06F 13/387 710/313 |
| 2012/0139927 A1 * | 6/2012 | Vembu ...................... | G06T 1/60 345/502 |
| 2012/0246381 A1 * | 9/2012 | Kegel .................... | G06F 12/109 711/6 |
| 2013/0007408 A1 * | 1/2013 | Franke ................ | G06F 12/1027 711/207 |

(Continued)

*Primary Examiner* — Titus Wong
(74) *Attorney, Agent, or Firm* — Alliance IP, LLC

(57) ABSTRACT

There is disclosed in one example an apparatus, including: a plurality of interconnects to communicatively couple an accelerator device to a host device; and an address translation module (ATM) to provide address mapping between host-physical address (HPA) and guest-physical address (GPA) spaces for the accelerator device, wherein the plurality of devices share a common GPA domain and wherein address mapping is to be associated with only one of the plurality of interconnects.

26 Claims, 15 Drawing Sheets

(56) References Cited

U.S. PATENT DOCUMENTS

| | | | |
|---|---|---|---|
| 2013/0067122 A1* | 3/2013 | Pavlov | G06F 13/28 |
| | | | 710/22 |
| 2013/0138840 A1* | 5/2013 | Kegel | G06F 12/1081 |
| | | | 710/22 |
| 2013/0235884 A1* | 9/2013 | Mamidwar | H04L 5/0044 |
| | | | 370/468 |
| 2014/0115420 A1* | 4/2014 | Willey | G06F 13/4282 |
| | | | 714/758 |
| 2016/0119069 A1* | 4/2016 | Mamidwar | H04N 21/23655 |
| | | | 370/503 |
| 2016/0364341 A1* | 12/2016 | Banginwar | G06F 9/45558 |
| 2018/0011651 A1* | 1/2018 | Sankaran | G06F 3/0665 |

\* cited by examiner

UNIFIED ADDRESS SPACE FOR MULTIPLE LINKS

FIELD OF THE SPECIFICATION

This disclosure relates in general to the field of network computing, and more particularly, though not exclusively, to a system and method for providing a unified address space for multiple links.

BACKGROUND

In some modern data centers, the function of a device or appliance may not be tied to a specific, fixed hardware configuration. Rather, processing, memory, storage, and accelerator functions may in some cases be aggregated from different locations to form a virtual "composite node." A contemporary network may include a data center hosting a large number of generic hardware server devices, contained in a server rack for example, and controlled by a hypervisor. Each hardware device may run one or more instances of a virtual device, such as a workload server or virtual desktop.

BRIEF DESCRIPTION OF THE DRAWINGS

The present disclosure is best understood from the following detailed description when read with the accompanying figures. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion.

EMBODIMENTS OF THE DISCLOSURE

Figure 1:
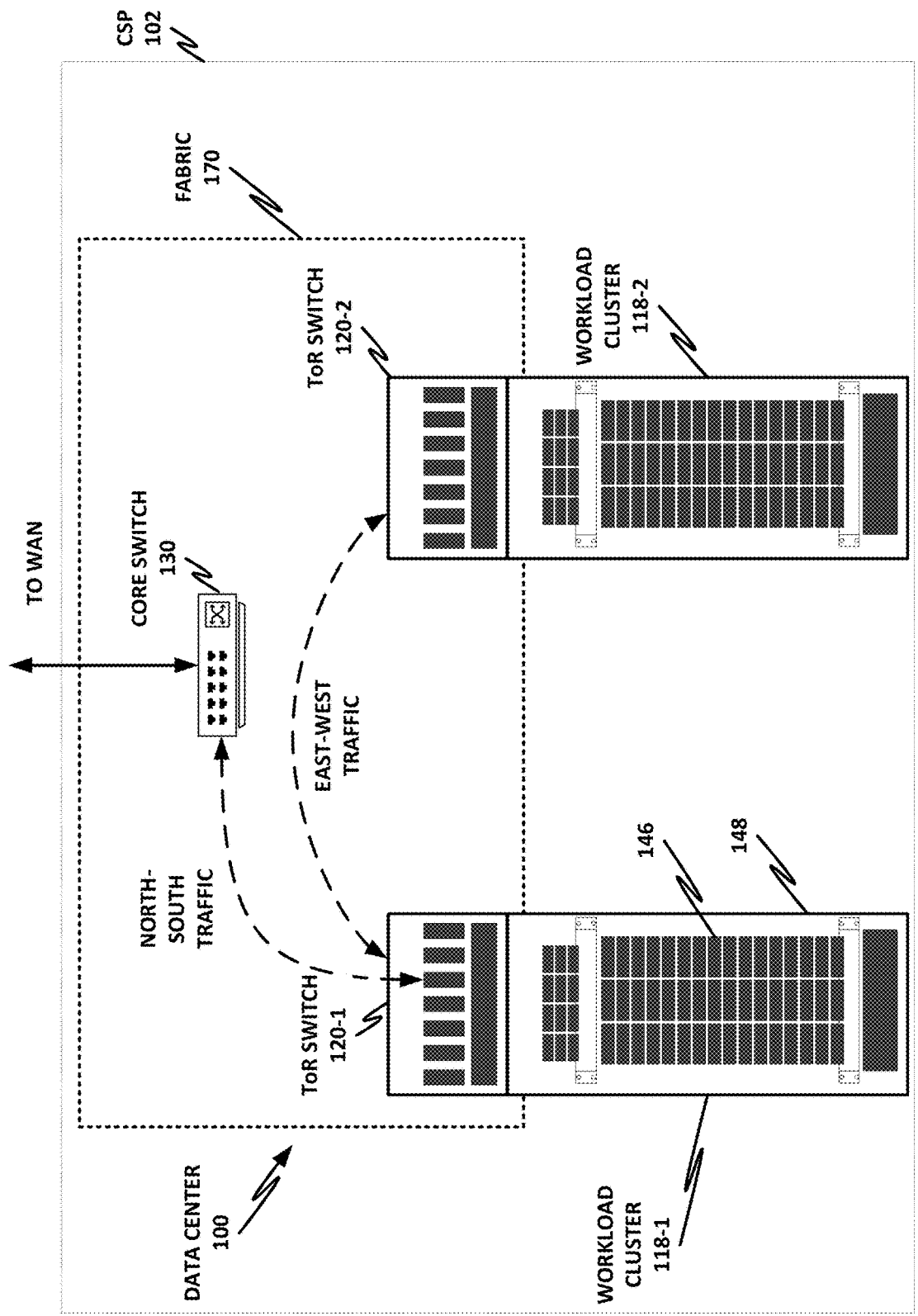
FIG. 1 is a block diagram of selected components of a data center with network connectivity, according to one or more examples of the present application.

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

A contemporary computing platform, such as a hardware platform provided by Intel® or similar, may include a capability for monitoring device performance and making decisions about resource provisioning. For example, in a large data center such as may be provided by a cloud service provider (CSP), the hardware platform may include rack-mounted servers with compute resources such as processors, memory, storage pools, accelerators, and other similar resources. As used herein, "cloud computing" includes network-connected computing resources and technology that enables ubiquitous (often worldwide) access to data, resources, and/or technology. Cloud resources are generally characterized by great flexibility to dynamically assign resources according to current workloads and needs. This can be accomplished, for example, via virtualization, wherein resources such as hardware, storage, and networks are provided to a virtual machine (VM) via a software abstraction layer, and/or containerization, wherein instances of network functions are provided in "containers" that are separated from one another, but that share underlying operating system, memory, and driver resources.

In a contemporary data center, such as may be provided by a cloud service provider (CSP) or high-performance computing (HPC) cluster, compute resources including central processing unit (CPU) cycles may be one of the primary monetizable resources. It is therefore beneficial to provide other resources that can provide offloading of specialized functions, thus freeing up CPU cycles to be monetized as well as increasing the overall efficiency of the data center.

To this end, a contemporary data center may provide devices such as accelerators for offloading various functions. For example, in an HPC cluster performing an artificial intelligence task such as in a convolutional neural network (CNN), training tasks may be offloaded to an accelerator so that more cycles are available to perform the actual convolutions on the CPU. In the case of a CSP, accelerators may be provided such as via Intel® accelerator link (IAL). In other embodiments, accelerators may also be provided as application-specific integrated circuits (ASICs), field-programmable gate arrays (FPGAs), coprocessors, digital signal processors (DSPs), graphics processing units (GPUs), or other processing entities, which may optionally be tuned or configured to provide the accelerator function. Accelerators may perform offloaded tasks that increase the efficiency of networking operations or that facilitate other specialized functions. By way of nonlimiting example, accelerators may provide compression, decompression, encryption, decryption, deep packet inspection, security services, or any other offloadable function.

Because of the high volume of data provided in a data center, it is often desirable to minimize the latency and maximize the bandwidth available for the CPU to communicate with the accelerator. Data centers may provide certain known high-bandwidth and/or low latency links such as Intel® Ultra Path Interconnect (UPI), QuickPath Interconnect (QPI), gigabit Ethernet, Infiniband, or peripheral component interconnect express (PCIe). Though many different species of interconnects are possible, the present specification will use UPI as a representative cache coherent interconnect, and PCIe as a representative non-cache coherent interconnect. While PCIe and UPI are provided herein as concrete and illustrative examples, these should be understood to be nonlimiting examples, and any other suitable interconnect type may be substituted as appropriate.

As the use of accelerators and other offloaded devices becomes more common, the demand for bandwidth between the CPU and these devices increases. Furthermore, interactions between the CPU and accelerators are also becoming more sophisticated, with greater demand for low latency, high bandwidth, coherency in some cases, and other semantics.

It is becoming increasingly difficult to satisfy all the demands for interconnect using a single interface. For example, PCIe provides for very high bandwidth, but current embodiments of PCIe do not provide cache coherency. On the other hand, UPI provides cache coherency and very low latency, but less bandwidth than PCIe. It is possible to use multiple links with different characteristics between the CPU and the accelerator to address the needs of the interconnect. However, this can complicate the software running on the CPU and the firmware or instructions running on the device, because each link will need to have its own drivers and support communications using different address spaces for each interconnect.

Consider, for example, a case where an interconnect between a CPU and FPGA requires:

Very high bandwidth,
Low latency, and
Coherency.

In this case, PCIe alone may not suffice because PCIe is not a cache coherent interconnect, and thus will not provide coherent access to system memory for the accelerator device. Coherency can be provided by the use of a coherent socket-to-socket interconnect such as QPI or UPI. However, QPI and UPI may not provide the high bandwidth of PCIe, and in many cases are less efficient for bulk transfers of data. To address this issue, some system designers may provide both a UPI and a PCIe link to the accelerator from the CPU.

In many processors, such as current Intel® Xeon® server CPUs, the CPU downstream port and the coherent interface (e.g., UPI) are considered part of the secure domain of the CPU complex. External devices under the CPU downstream port are protected at the root of the hierarchy in the CPU root complex. To provide isolation between memory accesses from each device, the CPU may implement address translation and security checks at the root complex. Thus, a dual link device connected to the CPU (e.g., with a PCIe and UPI interconnect) may be mapped to two distinct routes. The device therefore shows up as two distinct devices to the operating system, namely a PCIe device and a UPI device. Furthermore, memory accesses are mapped to two distinct secure address domains. This means that the software designer must manage two distinct devices to address a single accelerator, thus adding software complexity for a multi-link device. Furthermore, to provide even greater bandwidth, multiple PCIe interfaces may be provided.

By way of nonlimiting and illustrative example, this specification provides two cases where multiple PCIe interfaces are provided to a single logical accelerator device.

Figure 3:
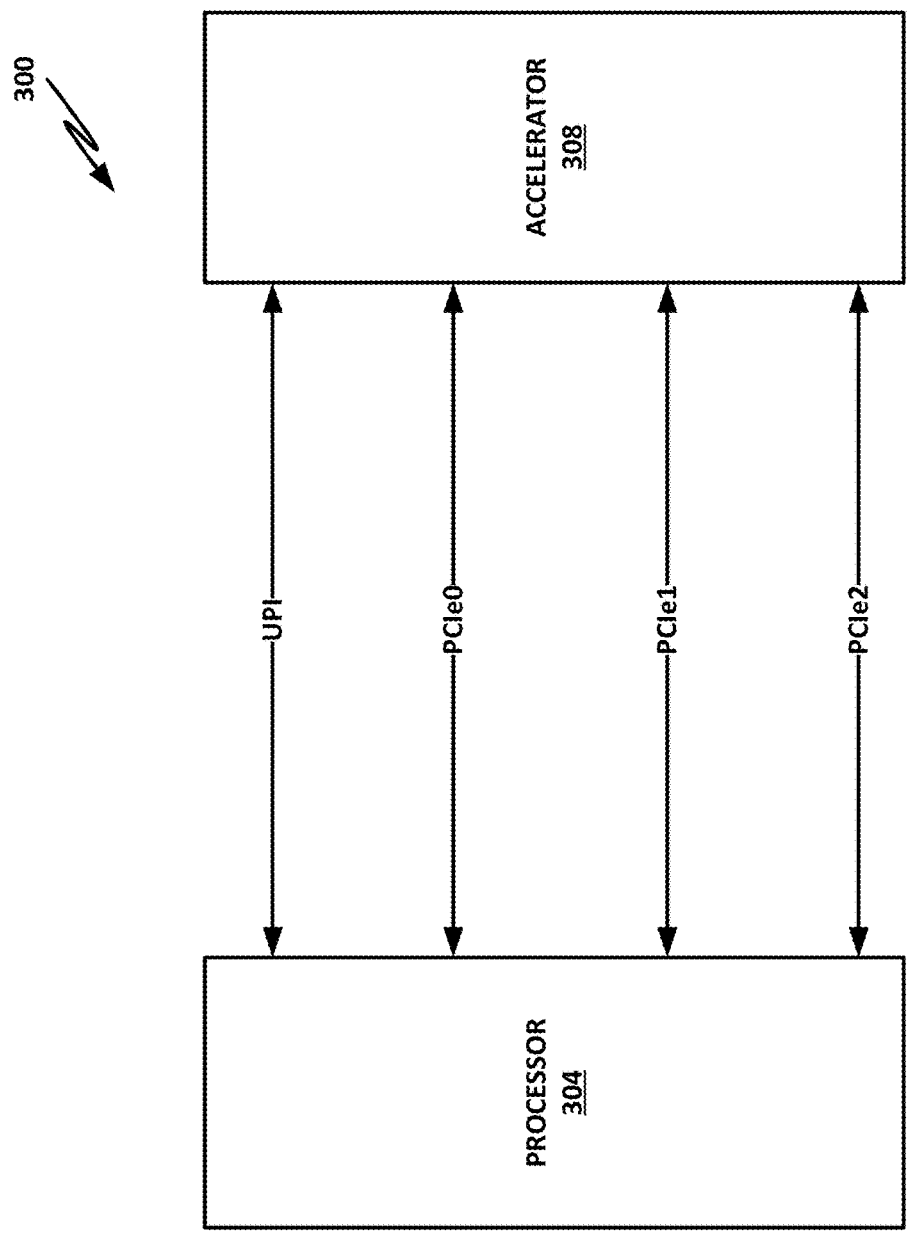
FIG. 3 is a block diagram of a system that may be found by way of example in a data center or other computing resource, according to one or more examples of the present specification.

In the first example, illustrated in FIG. 3 below, three PCIe interfaces are provided to a single accelerator device, in addition to a UPI interface. The three PCIe interfaces provide the ability for the accelerator to handle extremely high bandwidth transactions over the plurality of PCIe devices. The addition of a UPI device also provides the ability to handle cache coherent transactions with extremely low latency. However, in this example, the single accelerator illustrated in FIG. 3 is addressable as four distinct devices, because there are four discrete interfaces provided.

In a second example, as illustrated below in FIG. 4, a plurality of devices may operate cooperatively and have device-to-device links to communicate amongst themselves. These devices may, for example, perform different stages of the same operation, or may in parallel perform the same operation on three separate data. The CPU may have a PCIe link to each discrete device, but there may be logical reasons that the three devices can be addressed as a single logical device.

In both of the instances illustrated above, and in many other instances, it is advantageous to provide multiple physical links to the single physical or logical device, along with link aggregation schemes that allow the multiple links to be viewed logically as a single link in software. This provides the ability to leverage the benefits of having a plurality of links, without needing to add the software complexity of addressing the links separately.

Embodiments of the system and method of the present specification use an address translation and security check unit (ATU), and/or an address translation cache (ATC) to provide mapping between a guest-physical address (GPA) and a host-physical address (HPA). Embodiments of the present specification separate the logical view of the device from the physical link topology. In other words, physically, the multi-link device may be logically treated like a single link device from the point of view of the system and its software.

An operational principle of the present specification is a "one software view" of a multi-link device such that the software sees a single device link on link 0. When it performs an allocation operation (such as "malloc"), it allocates a buffer at a particular host-physical address for only link 0. Stated otherwise, the CPU mallocs a buffer at HPA-X for link 0. The device can then send GPA-X prime (GPA-X') across any link to reach that same HPA-X.

For a multi-link device, as illustrated in FIG. 3, the CPU and device may be configured such that the software can discover the device only on the physical link 0 hierarchy. Note that physical link 0 is illustrated herein as a logical choice for the sole physical link on which the device is discoverable, but this is a nonlimiting example only. In other embodiments, any of the plurality of links may be selected as the discoverable link. The other, non-selected physical links are hidden from the point of view of the software.

In some embodiments of the present specification, guest-to-host-physical address translation may be implemented on the device itself. This can be done by either implementing the ATU in the device in disabling the CPU-side ATU on all links. Note that this requires the CPU root to be extended to the device. In another embodiment, guest-to-host physical address translation may be implemented by an ATC in the device, in which all ATUs on the CPU side are disabled except the selected link (e.g., link 0) ATU. This link is always used to carry the host-physical address.

In either embodiment, the requester ID (RID) may be used by the system to identify which address domain the request should be mapped to. In other words, each physical interface may have its own address domain, and the CPU, in hardware or in microcode, may map a request to the address domain of a physical link using the RID. All requests from the device may use the same RID for address translation. By using the same RID, all requests are mapped to the same address domain.

This solution provides advantages with respect to other possible solutions. For example, in the case of multiple links, I/O virtualization could be disabled, so that the accelerator device cannot be virtualized. This may not be a widely acceptable solution in many data centers, as they may rely heavily on virtualization.

In other cases, virtualization may be enabled, but the device is treated as N partition devices, wherein N is equal to the number of physical interfaces. These N partitions may need to be managed by independent software drivers or instances of software drivers. This makes it difficult for the device to dynamically load balance bandwidth across links, and further adds software complexity for managing the end devices instead of treating the device as a single device having a single interconnect. For example, a 100 GB network interface card (NIC) connected via two PCIe G3x8 links may need to run two independent network stacks.

Advantageously, the system and method of the present specification may be managed as a single device by a single software driver, but can still take advantage of two or more physical links to realize the extra bandwidth of those links. This helps to scale the device performance without adding extra complexity for device and driver developers. Furthermore, this adds portability to the application. An application written for use with a device having a single interconnect can easily be ported to a system providing multiple interconnects, in some cases with no reprogramming at all. Rather, the software can dynamically adjust to the number of available interconnects, because the CPU itself manages the interconnects as though they were a single logical interconnect.

A system and method for providing a unified address space for multiple links will now be described with more particular reference to the attached FIGURES. It should be noted that throughout the FIGURES, certain reference numerals may be repeated to indicate that a particular device or block is wholly or substantially consistent across the FIGURES. This is not, however, intended to imply any particular relationship between the various embodiments disclosed. In certain examples, a genus of elements may be referred to by a particular reference numeral ("widget 10"), while individual species or examples of the genus may be referred to by a hyphenated numeral ("first specific widget 10-1" and "second specific widget 10-2").

FIG. 1 is a block diagram of selected components of a data center with connectivity to network 100 of a cloud service provider (CSP) 102, according to one or more examples of the present specification. Note that embodiments of the data center disclosed in this figure may be provided with and benefit from a unified address space for multiple links as described in the present specification. CSP 102 may be, by way of nonlimiting example, a traditional enterprise data center, an enterprise "private cloud," or a "public cloud," providing services such as infrastructure as a service (IaaS), platform as a service (PaaS), or software as a service (SaaS). In some cases, CSP 102 may provide, instead of or in addition to cloud services, high-performance computing (HPC) platforms or services. Indeed, while not expressly identical, HPC clusters ("supercomputers") may be structurally similar to cloud data centers, and unless and except where expressly specified, the teachings of this specification may be applied to either.

CSP 102 may provision some number of workload clusters 118, which may be clusters of individual servers, blade servers, rackmount servers, or any other suitable server topology. In this illustrative example, two workload clusters, 118-1 and 118-2 are shown, each providing rackmount servers 146 in a chassis 148.

In this illustration, workload clusters 118 are shown as modular workload clusters conforming to the rack unit ("U") standard, in which a standard rack, 19 inches wide, may be built to accommodate 42 units (42U), each 1.75 inches high and approximately 36 inches deep. In this case, compute resources such as processors, memory, storage, accelerators, and switches may fit into some multiple of rack units from one to 42.

Each server 146 may host a standalone operating system and provide a server function, or servers may be virtualized, in which case they may be under the control of a virtual machine manager (VMM), hypervisor, and/or orchestrator, and may host one or more virtual machines, virtual servers, or virtual appliances. These server racks may be collocated in a single data center, or may be located in different geographic data centers. Depending on the contractual agreements, some servers 146 may be specifically dedicated to certain enterprise clients or tenants, while others may be shared.

The various devices in a data center may be connected to each other via a switching fabric 170, which may include one or more high speed routing and/or switching devices. Switching fabric 170 may provide both "north-south" traffic (e.g., traffic to and from the wide area network (WAN), such as the internet), and "east-west" traffic (e.g., traffic across the data center). Historically, north-south traffic accounted for the bulk of network traffic, but as web services become more complex and distributed, the volume of east-west traffic has risen. In many data centers, east-west traffic now accounts for the majority of traffic.

Furthermore, as the capability of each server 146 increases, traffic volume may further increase. For example, each server 146 may provide multiple processor slots, with each slot accommodating a processor having four to eight cores, along with sufficient memory for the cores. Thus, each server may host a number of VMs, each generating its own traffic.

To accommodate the large volume of traffic in a data center, a highly capable switching fabric 170 may be provided. Switching fabric 170 is illustrated in this example as a "flat" network, wherein each server 146 may have a direct connection to a top-of-rack (ToR) switch 120 (e.g., a "star" configuration), and each ToR switch 120 may couple to a core switch 130. This two-tier flat network architecture is shown only as an illustrative example. In other examples, other architectures may be used, such as three-tier star or leaf-spine (also called "fat tree" topologies) based on the "Clos" architecture, hub-and-spoke topologies, mesh topologies, ring topologies, or 3-D mesh topologies, by way of nonlimiting example.

The fabric itself may be provided by any suitable interconnect. For example, each server 146 may include an Intel® Host Fabric Interface (HFI), a NIC, a host channel adapter (HCA), or other host interface. For simplicity and unity, these may be referred to throughout this specification as a "host fabric interface" (HFI), which should be broadly construed as an interface to communicatively couple the host to the data center fabric. The HFI may couple to one or more host processors via an interconnect or bus, such as PCI, PCIe, or similar. In some cases, this interconnect bus, along with other "local" interconnects (e.g., core-to-core Ultra Path Interconnect) may be considered to be part of fabric 170. In other embodiments, the UPI (or other local coherent interconnect) may be treated as part of the secure domain of the processor complex, and thus not part of the fabric.

The interconnect technology may be provided by a single interconnect or a hybrid interconnect, such as where PCIe provides on-chip communication, 1 Gb or 10 Gb copper Ethernet provides relatively short connections to a ToR switch 120, and optical cabling provides relatively longer connections to core switch 130. Interconnect technologies that may be found in the data center include, by way of nonlimiting example, Intel® Omni-Path™ Architecture (OPA), TrueScale™, Ultra Path Interconnect (UPI) (formerly called QPI or KTI), FibreChannel, Ethernet, FibreChannel over Ethernet (FCoE), InfiniBand, PCI, PCIe, or fiber optics, to name just a few. The fabric may be cache- and memory-coherent, cache- and memory-non-coherent, or a hybrid of coherent and non-coherent interconnects. Some interconnects are more popular for certain purposes or functions than others, and selecting an appropriate fabric for the instant application is an exercise of ordinary skill. For example, OPA and Infiniband are commonly used in high-performance computing (HPC) applications, while Ethernet and FibreChannel are more popular in cloud data centers. But these examples are expressly nonlimiting, and as data centers evolve fabric technologies similarly evolve.

Note that while high-end fabrics such as OPA are provided herein by way of illustration, more generally, fabric 170 may be any suitable interconnect or bus for the particular application. This could, in some cases, include legacy interconnects like local area networks (LANs), token ring networks, synchronous optical networks (SONET), asynchronous transfer mode (ATM) networks, wireless networks such as WiFi and Bluetooth, "plain old telephone system" (POTS) interconnects, or similar. It is also expressly anticipated that in the future, new network technologies will arise to supplement or replace some of those listed here, and any such future network topologies and technologies can be or form a part of fabric 170.

In certain embodiments, fabric 170 may provide communication services on various "layers," as originally outlined in the Open System Interconnection (OSI) seven-layer network model. In contemporary practice, the OSI model is not followed strictly. In general terms, layers 1 and 2 are often called the "Ethernet" layer (though in some data centers or supercomputers, Ethernet may be supplanted or supplemented by newer technologies). Layers 3 and 4 are often referred to as the transmission control protocol/internet protocol (TCP/IP) layer (which may be further subdivided into TCP and IP layers). Layers 5-7 may be referred to as the "application layer." These layer definitions are disclosed as a useful framework, but are intended to be nonlimiting.

Figure 2:
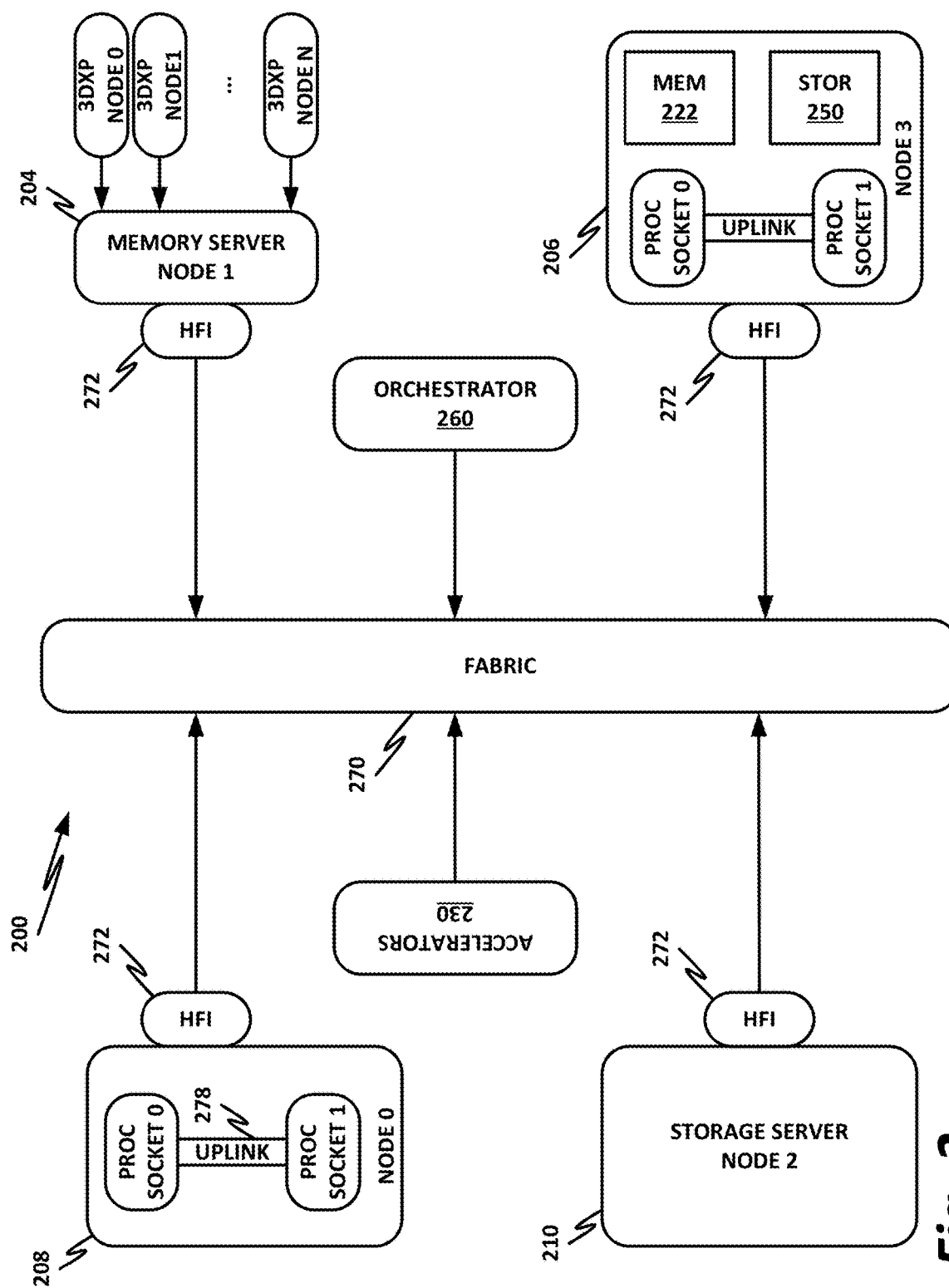
FIG. 2 is a block diagram of selected components of an end-user computing device, according to one or more examples of the present specification.

FIG. 2 is a block diagram of selected components of an end-user computing device 200, according to one or more examples of the present specification. Note that embodiments of the computing device 200 disclosed in this figure may be provided with and benefit from a unified address space for multiple links as described in the present specification. As above, computing device 200 may provide, as appropriate, cloud service, high-performance computing, telecommunication services, enterprise data center services, or any other compute services that benefit from a computing device 200.

In this example, a fabric 270 is provided to interconnect various aspects of computing device 200. Fabric 270 may be the same as fabric 170 of FIG. 1, or may be a different fabric. As above, fabric 270 may be provided by any suitable interconnect technology. In this example, Intel® Omni-Path™ is used as an illustrative and nonlimiting example.

As illustrated, computing device 200 includes a number of logic elements forming a plurality of nodes. It should be understood that each node may be provided by a physical server, a group of servers, or other hardware. Each server may be running one or more virtual machines as appropriate to its application.

Node 0 208 is a processing node including a processor socket 0 and processor socket 1. The processors may be, for example, Intel® Xeon® processors with a plurality of cores, such as 4 or 8 cores. Node 0 208 may be configured to provide network or workload functions, such as by hosting a plurality of virtual machines or virtual appliances.

Onboard communication between processor socket 0 and processor socket 1 may be provided by an onboard uplink 278. This may provide a very high speed, short-length interconnect between the two processor sockets, so that virtual machines running on node 0 208 can communicate with one another at very high speeds. To facilitate this communication, a virtual switch (vSwitch) may be provisioned on node 0 208, which may be considered to be part of fabric 270.

Node 0 208 connects to fabric 270 via an HFI 272. HFI 272 may connect to an Intel® Omni-Path™ fabric. In some examples, communication with fabric 270 may be tunneled, such as by providing UPI tunneling over Omni-Path™.

Because computing device 200 may provide many functions in a distributed fashion that in previous generations were provided onboard, a highly capable HFI 272 may be provided. HFI 272 may operate at speeds of multiple gigabits per second, and in some cases may be tightly coupled with node 0 208. For example, in some embodiments, the logic for HFI 272 is integrated directly with the processors on a system-on-a-chip. This provides very high speed communication between HFI 272 and the processor sockets, without the need for intermediary bus devices, which may introduce additional latency into the fabric. However, this is not to imply that embodiments where HFI 272 is provided over a traditional bus are to be excluded. Rather, it is expressly anticipated that in some examples, HFI 272 may be provided on a bus, such as a PCIe bus, which is a serialized version of PCI that provides higher speeds than traditional PCI. Throughout computing device 200, various nodes may provide different types of HFIs 272, such as onboard HFIs and plug-in HFIs. It should also be noted that certain blocks in a system on a chip may be provided as intellectual property (IP) blocks that can be "dropped" into an integrated circuit as a modular unit. Thus, HFI 272 may in some cases be derived from such an IP block.

Note that in "the network is the device" fashion, node 0 208 may provide limited or no onboard memory or storage. Rather, node 0 208 may rely primarily on distributed services, such as a memory server and a networked storage server. Onboard, node 0 208 may provide only sufficient memory and storage to bootstrap the device and get it communicating with fabric 270. This kind of distributed architecture is possible because of the very high speeds of contemporary data centers, and may be advantageous because there is no need to over-provision resources for each node. Rather, a large pool of high-speed or specialized memory may be dynamically provisioned between a number of nodes, so that each node has access to a large pool of resources, but those resources do not sit idle when that particular node does not need them.

In this example, a node 1 memory server 204 and a node 2 storage server 210 provide the operational memory and storage capabilities of node 0 208. For example, memory server node 1 204 may provide remote direct memory access (RDMA), whereby node 0 208 may access memory resources on node 1 204 via fabric 270 in a direct memory access fashion, similar to how it would access its own onboard memory. The memory provided by memory server 204 may be traditional memory, such as double data rate type 3 (DDR3) dynamic random access memory (DRAM), which is volatile, or may be a more exotic type of memory, such as a persistent fast memory (PFM) like Intel® 3D XPoint (3DXP™), which operates at DRAM-like speeds, but is nonvolatile.

Similarly, rather than providing an onboard hard disk for node 0 208, a storage server node 2 210 may be provided. Storage server 210 may provide a networked bunch of disks (NBOD), PFM, redundant array of independent disks (RAID), redundant array of independent nodes (RAIN), network attached storage (NAS), optical storage, tape drives, or other nonvolatile memory solutions.

Thus, in performing its designated function, node 0 208 may access memory from memory server 204 and store results on storage provided by storage server 210. Each of these devices couples to fabric 270 via a HFI 272, which provides fast communication that makes these technologies possible.

By way of further illustration, node 3 206 is also depicted. Node 3 206 also includes a HFI 272, along with two processor sockets internally connected by an uplink. However, unlike node 0 208, node 3 206 includes its own onboard memory 222 and storage 250. Thus, node 3 206 may be configured to perform its functions primarily onboard, and may not be required to rely upon memory server 204 and storage server 210. However, in appropriate circumstances, node 3 206 may supplement its own onboard memory 222 and storage 250 with distributed resources similar to node 0 208.

Computing device 200 may also include accelerators 230. These may provide various accelerated functions, including hardware or coprocessor acceleration for functions such as packet processing, encryption, decryption, compression, decompression, network security, or other accelerated functions in the data center. In some examples, accelerators 230 may include deep learning accelerators that may be directly attached to one or more cores in nodes such as node 0 208 or node 3 206. Examples of such accelerators can include, by way of nonlimiting example, Intel® QuickData Technology (QDT), Intel® QuickAssist Technology (QAT), Intel® Direct Cache Access (DCA), Intel® Extended Message Signaled Interrupt (MSI-X), Intel® Receive Side Coalescing (RSC), and other acceleration technologies.

The basic building block of the various components disclosed herein may be referred to as "logic elements." Logic elements may include hardware (including, for example, a software-programmable processor, an ASIC, or an FPGA), external hardware (digital, analog, or mixed-signal), software, reciprocating software, services, drivers, interfaces, components, modules, algorithms, sensors, components, firmware, microcode, programmable logic, or objects that can coordinate to achieve a logical operation. Furthermore, some logic elements are provided by a tangible, non-transitory computer-readable medium having stored thereon executable instructions for instructing a processor to perform a certain task. Such a non-transitory medium could include, for example, a hard disk, solid state memory or disk, read-only memory (ROM), persistent fast memory (PFM) (e.g., Intel® 3DXP™), external storage, redundant array of independent disks (RAID), redundant array of independent nodes (RAIN), network-attached storage (NAS), optical storage, tape drive, backup system, cloud storage, or any combination of the foregoing by way of nonlimiting example. Such a medium could also include instructions programmed into an FPGA, or encoded in hardware on an ASIC or processor.

FIG. 3 is a block diagram of a system 300 that may be found by way of example in a data center or other computing resource, according to one or more examples of the present specification. System 300 includes a processor 304 and an accelerator 308. Processor 304 and accelerator 308 are communicatively coupled to one another via a plurality of interconnects. For example, in this case, processor 304 includes a UPI interconnect to accelerator 308, which may provide low latency and cache coherency, thus allowing accelerator 308 to coherently access the memory space of processor 304, and if accelerator 308 includes its own onboard memory, that onboard memory may be coherently mapped to the native address space of processor 304. System 300 also provides between processor 304 and accelerator 308 three separate PCIe interfaces, namely PCIe 0, PCIe 1, and PCIe 2. These three separate PCIe interfaces may be provided so that much higher bandwidth could be provided than would be available in a single UPI link, or in a single PCIe link. Thus, the combination of one UPI link and three PCIe links, which is provided as an illustrative and nonlimiting example only, advantageously provides cache coherency and low latency via the UPI link, and extremely high bandwidth via the three PCIe links.

However, as illustrated above, with traditional addressing modes, software running on processor 304 would need to address accelerator 308 as four separate devices to realize the advantages of the various links. This significantly complicates the design and deployment of software on processor 304.

Embodiments of I/O virtualization technology map each device to a unique address domain by creating a page table per device. By way of example, the page table walk uses the {requester ID, guest physical address} to determine the host-physical address. For example, on a PCIe link, the RID is {bus, device, function}.

Some existing CPUs may assume that a device on each link has a unique RID. Therefore, when a request with the same GPA goes down two different links, they perform a page walk with the same GPA but with a different RID. This walks two different page tables resulting in different host addresses. As part of the secure design principles of virtualization, certain existing VMMs do not allow two different RIDs to share the same page tables or to have identical copies of the two page tables.

Thus, while system 300 of FIG. 3 realizes increased bandwidth over the multiple provided links, the CPU I/O virtualization technology maps a device behind each link as a separate device with an independent address domain. In this case, the device ends up with four address domains. This can make it difficult to aggregate the bandwidth across the three PCIe links, in addition to the additional complexity provided by the UPI link.

This type of configuration is commonly provided in existing systems, such as SKX+FPGA MCP.

As discussed above, these types of deployments can benefit from the teachings of the present specification by providing a single address domain (or optionally, a single address domain per species of link) so that software complexity is greatly reduced, and utilization of the available bandwidth can be optimized.

Note that in certain embodiments of the present specification, the single UPI link illustrated in this figure may be treated as a separate address domain from the three provided PCIe links. This can have security implications, because UPI is a coherent link, and accelerator 308 can be treated as a part of the secure domain or root complex of processor 304, so long as communications take place via UPI link. On the other hand, PCIe is not a coherent link, and thus communications via the PCIe links may not be treated as part of the root domain. Thus, in some embodiments, accelerator 308 may appear as two separate devices, namely a first device connected via the UPI link that is treated as part of the secure domain of the root complex, and a second device connected via a single logical PCIe link (with three aggregated physical links) that is not treated as part of the secure domain of processor 304.

In other embodiments, all four links may be treated as a single logical interconnect, with communication being managed at a low level to realize optimized transactions. For example, low latency transactions that do not require high bandwidth may be sent via the UPI link, while large bandwidth transactions may be sent via one or more of the PCIe links. In this case, accelerator 308 may appear as a single logical device that is not in the secure domain of processor 304, and that has a single logical interconnect. Those with skill in the art will recognize that many other types of combinations are possible.

Figure 4:
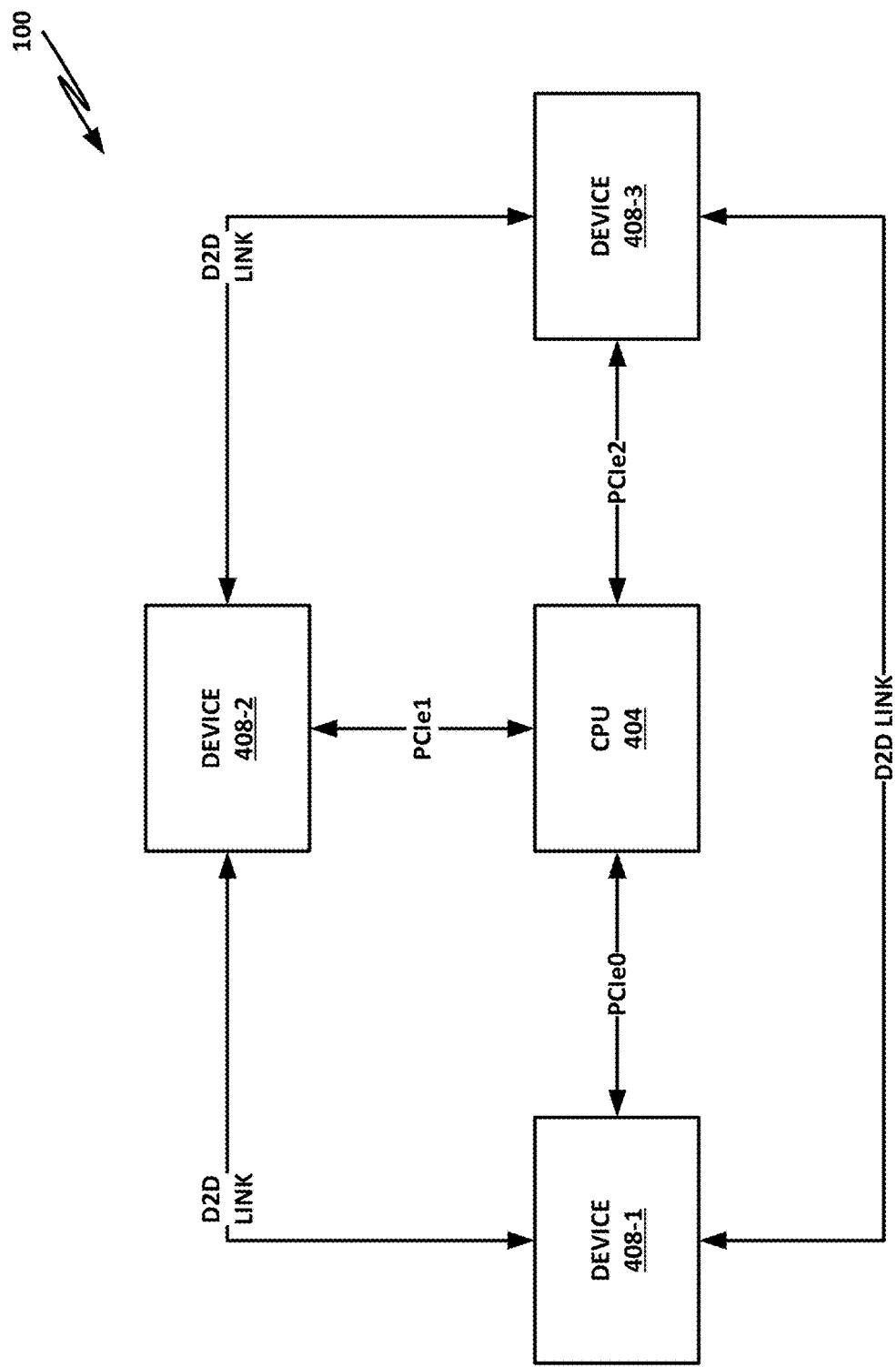
FIG. 4 is a block diagram of a second system that may also realize advantages, according to the teachings of the present specification.

FIG. 4 is a block diagram of a second system 400 that may also realize advantages, according to the teachings of the present specification.

In this case, CPU 404 is communicatively coupled via three independent PCIe links to three devices 408-1, 408-2, and 408-3. This provides a distributed computing model in which, more generally, N devices are connected to processor 404 via N interconnects. Devices 408 may also communicate with each other via one or more device-to-device links, which may be provided for the purpose of dynamically moving tasks across devices.

Existing CPU I/O virtualization models require that each device operates in a different address domain. However, with each device working in a different address domain, it is relatively difficult to migrate tasks over from one device to another. Thus, system 400 illustrated in FIG. 4 may also benefit from the ability to address devices 408-1, 408-2, and 408-3 as a single logical device connected to CPU 404 via a single logical interconnect comprising interconnects PCIe 0, PCIe 1, and PCIe 2.

The addressing of a single device with a plurality of interconnects, or a plurality of devices, each having one or more interconnects, as a single logical device having a single logical interconnect can be realized via an address translation module (ATM) provided on the device itself.

Figure 5A:
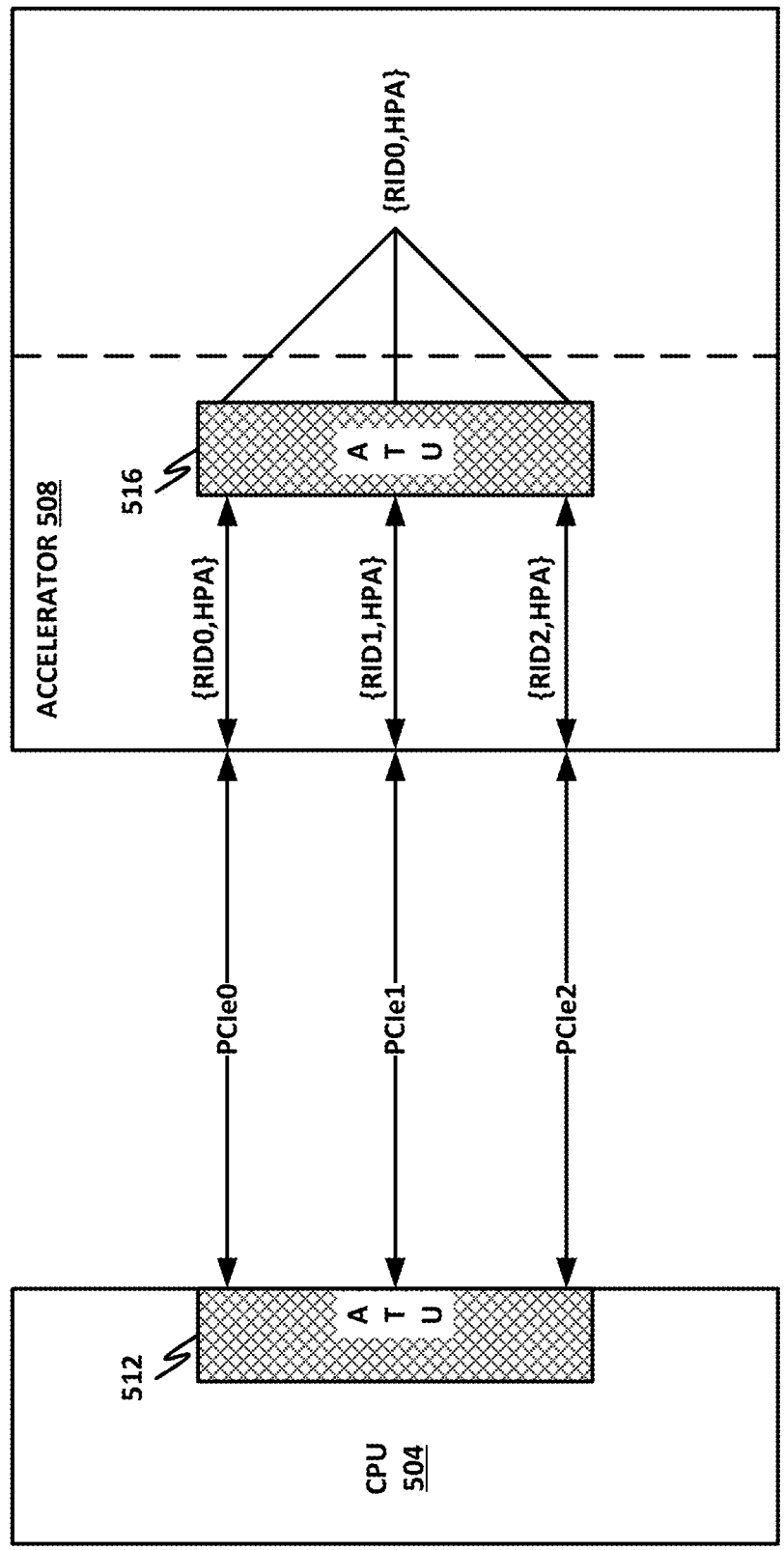
FIG. 5a illustrates an embodiment wherein an address translation module (ATM) is provided as an address translation and security check unit (ATU) in an accelerator, according to one or more examples of the present specification.
Figure 5B:
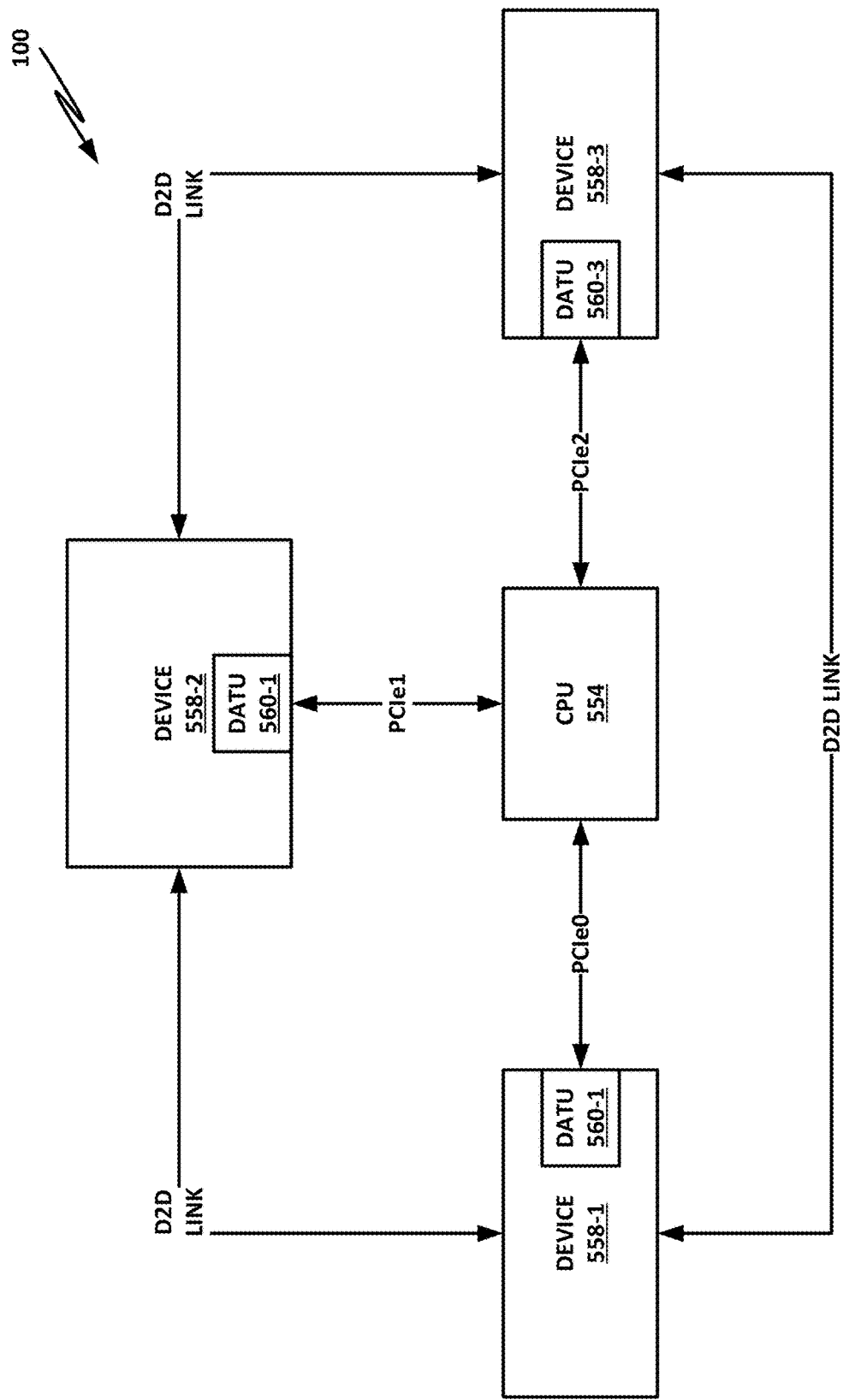
FIG. 5b illustrates an embodiment wherein a central processing unit (CPU) operates with three accelerator devices, according to one or more examples of the present specification.
Figure 7:
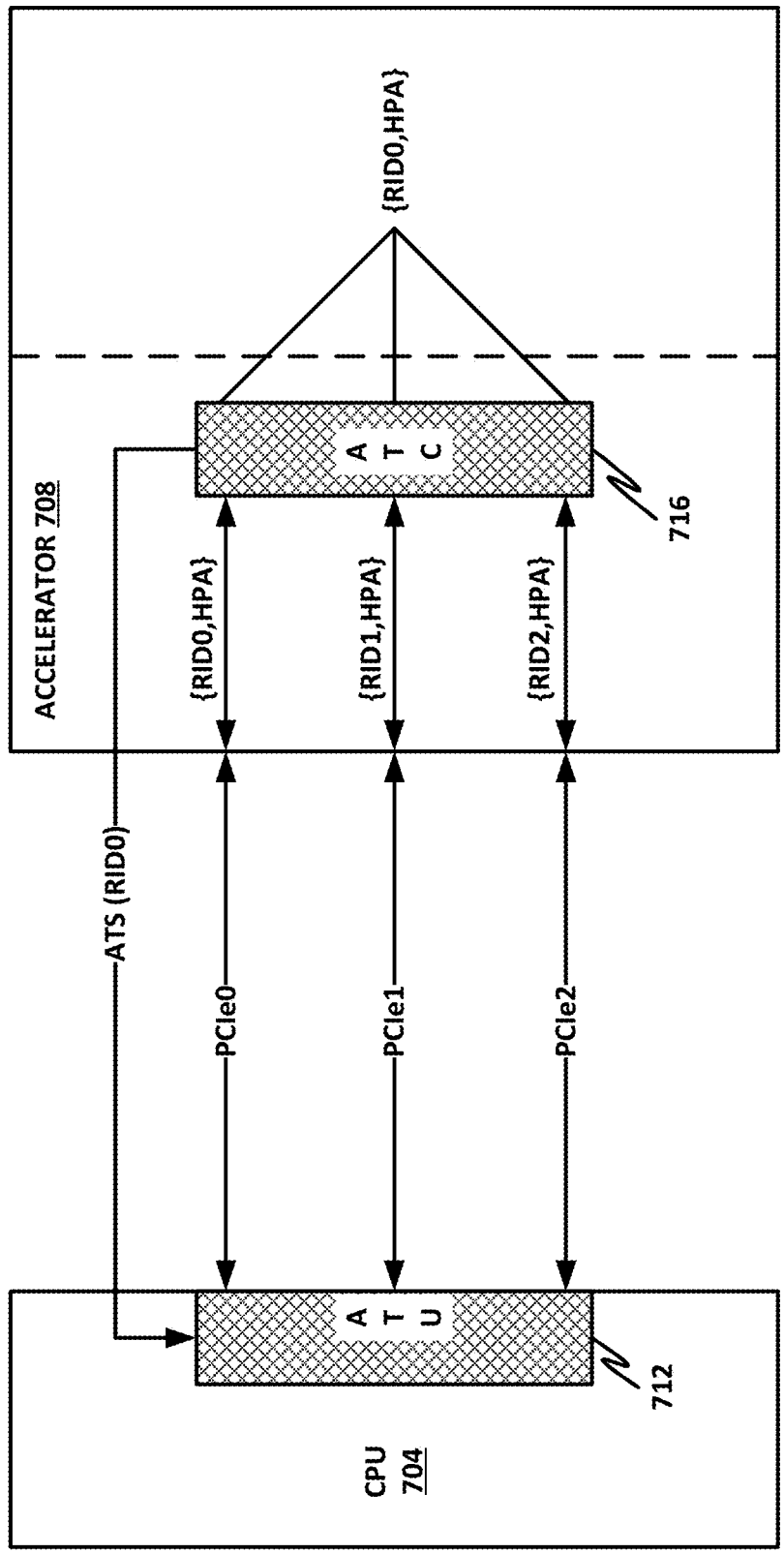
FIG. 7 is a block diagram illustrating use of an address translation cache as the ATM, according to one or more examples of the present specification.

FIGS. 5a, 5b, and 7 below illustrate three different embodiments of an address translation module that may be provided according to the present specification. Note that the ATM of FIG. 5 and address translation cache of FIG. 7 are provided as nonlimiting examples of ATMs.

An ATM as described in this specification can include hardware, microcode instructions, firmware, software, a coprocessor, an intellectual property block, or other hardware platform or part of a hardware platform configured to provide the operations of the ATM. In some embodiments, an ATM may include one or more tangible, non-transitory computer readable mediums having stored thereon instructions to instruct a processor to provide the ATM, or having stored thereon instructions for provisioning an ATM (e.g., register transfer language (RTL) instructions or directives, or other hardware description language instructions or directives for provisioning the logic of an ATM in an FPGA, ASIC, IP block, or other hardware or module), as well as instructions that could be executed on a programmable processor.

FIG. 5a illustrates an embodiment wherein the ATM is provided as an ATU in accelerator 508, according to one or more examples of the present specification.

As seen in FIG. 5a, CPU 504 may include its own address translation unit 512, which provides three separate PCIe interconnects to accelerator 508. These interconnects may be identified according to RIDs, for example RID 0 for PCIe 0, RID 1 for PCIe 1, and RID 2 for PCIe 2.

CPU 504, as well as the other CPUs and processors illustrated herein (for example, in FIGS. 5b and 7) are provided by way of nonlimiting example only. In other embodiments, any suitable host device may be substituted for the illustrated CPUs.

In existing systems, each RID may be associated with a separate logical device, even though the three interconnects are provided to the same physical accelerator 508.

To enable CPU 504 to address accelerator 508 as a single logical device with a single logical PCIe interconnect, ATU 512 on CPU 504 may be disabled, and an ATU 516 may be provided on accelerator 508. RID0 may be used for all address translations, while the actual transactions are mapped to one of the physical buses via RIDx (where "x" is the identifier of the physical bus to handle the transaction).

As used in this specification, an ATU may be an address translation and security check unit, which in some embodiments may be compatible with the Intel® virtualization technology for directed I/O (VT-d) specification. A purpose of the ATU is to provide address space isolation, and to enforce permission checks for I/O devices. This may involve a state machine that can walk OS-managed page tables and caches to store intermediate translations. ATU 516 can provide HPA-to-GPA and/or HPA-to-guest virtual address (GVA) mapping. A guest-physical address may be a physical address as seen by the guest operating system or virtual machine. Note that a GPA may not be a real physical address as seen by the machine and the actual DRAMs. The host-physical address is a physical address as seen by the VMM or the machine. This may be the address used to access the physical DRAMs.

By placing ATU 516 on accelerator 508 and disabling ATU 512 on CPU 504, the logical view of the accelerator device can be separated from the physical topology. The multiple links to accelerator 508 can be logically treated as a single logical link from the point of view of software running on CPU 504. Software running on CPU 504 sees a single device on PCIe 0, it mallocs a buffer at HPA-X for only PCIe 0. Accelerator 508 can send a GPA-X' across any of the PCIe links to reach the same HPA-X.

In this embodiment, each interconnect (e.g., RID0, RID1, RID2) can walk its own memory pages.

Figure 6:
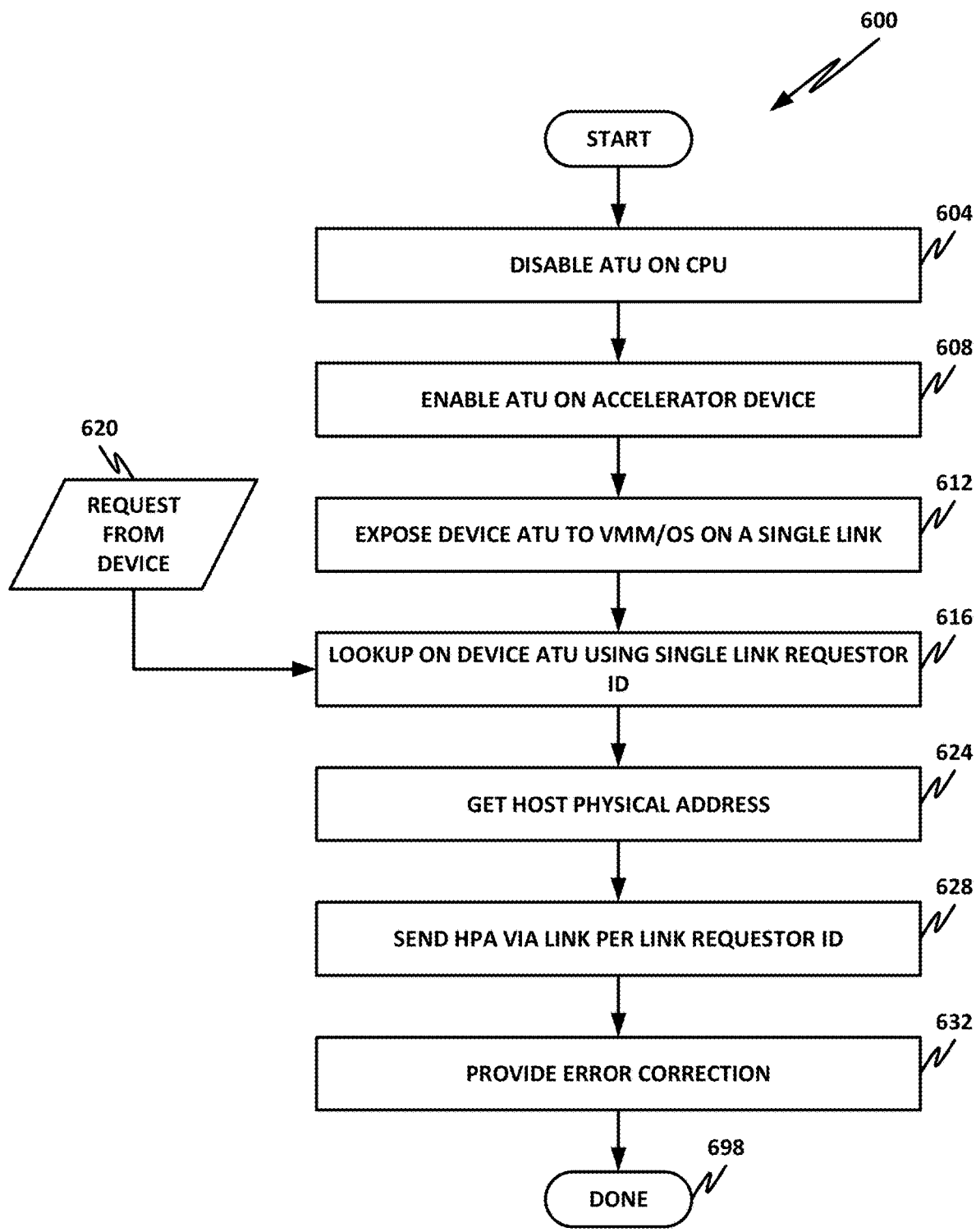
FIG. 6 is a flowchart of a method of providing address translation via an ATU in an accelerator, or in any other suitable system configuration, according to one or more examples of the present specification.

FIG. 5*b* illustrates a similar embodiment. However, in the example of FIG. 5*b*, CPU 554 operates with three accelerator devices 558-1, 5582, 558-3. While it is possible that all address translation could be performed on a single ATU (for example, located on device 1 558-1), the availability of a plurality of devices makes it possible to distribute address translation across multiple devices by way of a distributed ATU (DATU). For example, as shown here, device 1 558-1 has DATU 560-1, device 2 558-2 has DATU 560-2, and device 3 558-3 has DATU 560-3. Load balancing address translation between the DATUs can be accomplished via any suitable method, including a method in which each device 558 handles address translation for its own transactions and can perform its own page walk. Note that CPU 554 need not be aware of the distributed nature of DATU 560. Rather, the three devices appear to the CPU to be a single logical device, with a single logical ATU. Note that in FIG. 7 below, an address translation cache (ATC) is used instead of an ATC. The FIG. 6 is a flowchart of a method 600 of providing address translation via ATU 516 of accelerator 508, or in any other suitable system configuration, according to one or more examples of the present specification. In method 600, at block 604, the system disables the ATU, such as ATU 512 of CPU 504, implemented for the plurality of links to the accelerator device. This essentially disables the virtualization capabilities provided by the CPU for these interconnects, such as the three PCIe interconnects illustrated in FIG. 5*a*. Note however that the virtualization technology is a system-wide capability, which means that in some cases, it is not possible to have a system in which some devices are virtualized and other devices are not. This is provided as a nonlimiting example only.

In block 608, the system provisions and/or enables an ATU on the accelerator device, such as ATU 516 of accelerator 508. This ATU covers one of the links, such as link PCIe 0. However, any of the links could be selected, such as PCIe 1 or PCIe 2.

Note that in some cases, the system may assume that the ATU is integrated in the CPU. Moving the ATU to the accelerator device, such as device 508 of FIG. 5, may require some changes to the device enumeration flow, enabling access to additional memory-mapped I/O base address registers (MMIO BARs) for the VT-d unit. These changes may be CPU architecture dependent for some platforms, and the PCIe endpoint may need to be declared as a root complex integrated endpoint (RCiEP). It is anticipated that making such changes to the CPU architecture is within the ability of a person having skill in the art.

In block 612, the system exposes the device ATU to the VMM or OS on a single line, such as PCIe 0.

At block 616, a request 620 from the device, such as accelerator device 508, is received. In some embodiments, all requests from the accelerator device are looked up on the ATU of the accelerator device using the link 0 RID to get the host-physical address. Such aggregated lookups are illustrated on device 508 of FIG. 5.

In block 624, the ATU on the accelerator gets the host-physical address.

At block 628, after address translation, the request is sent over the link with the host-physical address and a per-link RID. For example, a request going over PCIe 0 may have {RID0, HPA}. A request over PCIe 1 may have {RID1, HPA}. A request over PCIe 2 may have {RID2, HPA}.

In block 632, in some embodiments, on the CPU side of the link error detection or routing assumptions may be provided and built into RID. This replaces the single RID with link-specific, unique RIDs before the request goes out to the CPU. This is acceptable, because link virtualization capabilities on the CPU side may be disabled.

FIG. 7 is a block diagram illustrating use of an address translation cache as the ATM, according to one or more examples of the present specification.

As used in this specification, an address translation cache (ATC) is a translation cache that may cache addresses translated by the address translation and security check unit (ATU). The ATC may not be capable of doing page walks. When a request misses the ATC, the ATC coordinates with the ATU to do a page walk. This may include, for example, address translation services as defined in the PCIe specification.

In the embodiment of FIG. 7, CPU 704 is provided with ATU 712, while accelerator 708 is provided with ATC 716. Note that unlike ATU 512 of CPU 504 of FIG. 5*a*, ATU 712 of CPU 704 is not disabled. Rather, ATU 712 may enable address translation services only on a single link such as PCIe 0. Thus, as in FIG. 5*a*, GPA to HPA translation is always done over PCIe 0 (with RID0). Accelerator 708 then provides the HPA to CPU 704 via PCIe 0, with the correct RIDx, and the actual transaction is handled on PCIe x.

As before, ATC 716 aggregates requests into {RID0, HPA}. However, actual communication may be carried out with a specific RID. For example, for PCIe 0, {RID0, HPA}. For PCIe 1, {RID1, HPA}. For PCIe 2, {RID2, HPA}. In this embodiment, only the interconnect associated with address translation (e.g., RID0) can walk the address page.

In the foregoing FIGURES, the address translation modules (ATMs), namely ATU 516 (FIG. 5*a*), DATU 560 (FIG. 5*b*), and ATC 716 (FIG. 7), are illustrated as a part of accelerator 508. However, other embodiments include an ATM that is not integrated with the accelerator device. In these embodiments, the ATM comprise be a separate ASIC, FPGA, IP block, circuit, programmable logic, ROM, or other device that provides the address translation services between the host device and the accelerator device.

In some embodiments, an ATM as illustrated in any of the foregoing figures may also provide nested GPA-to-GVA (guest virtual address) translation.

Figure 8:
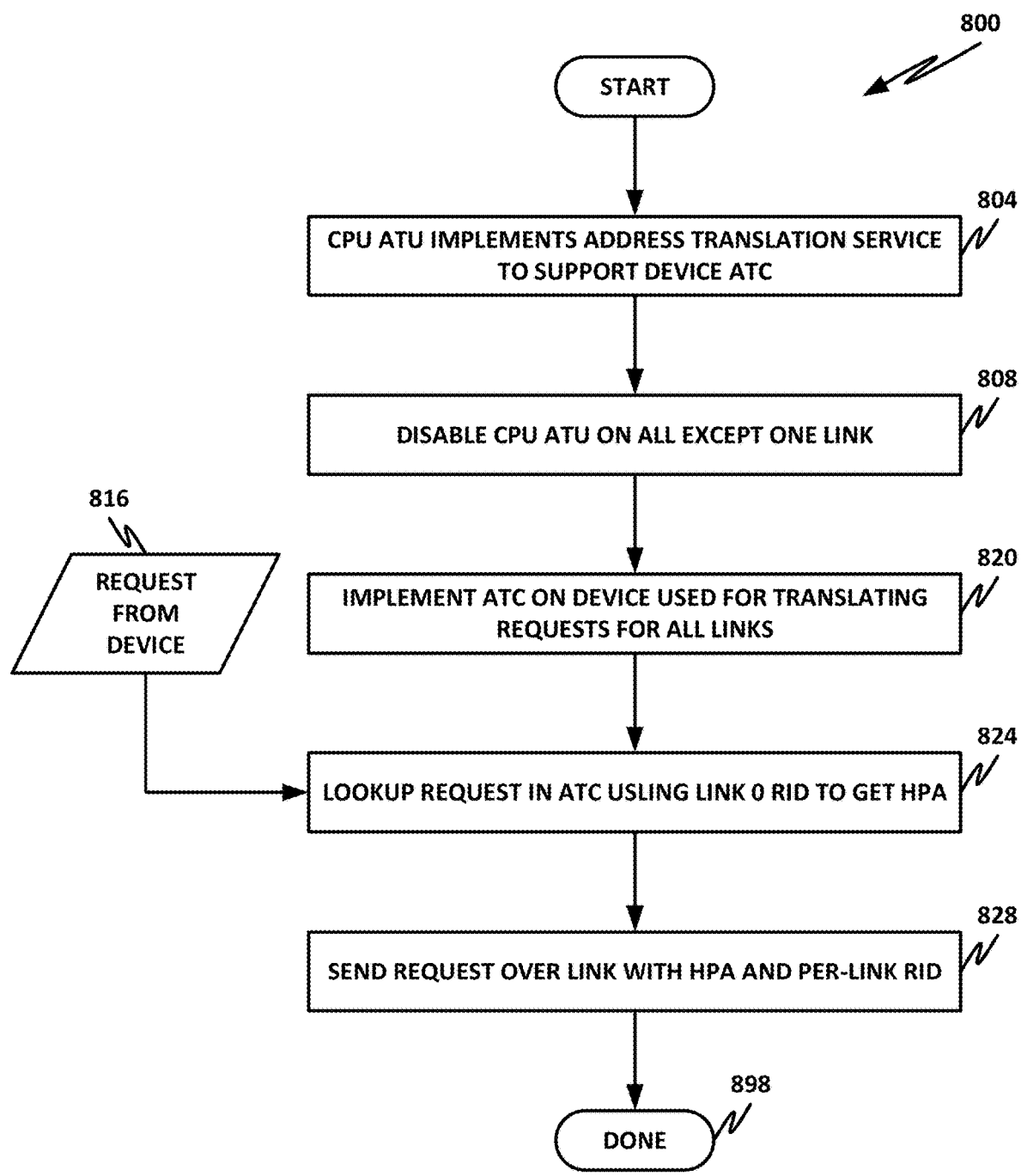
FIG. 8 is a flowchart of a method that may be performed by a system wherein the address translation module is embodied in an ATC on the accelerator device, according to one or more examples of the present specification.

FIG. 8 is a flowchart of a method 800 that may be performed, for example, by a system such as that disclosed in FIG. 7, wherein the address translation module is embodied in an ATC on the accelerator device, according to one or more examples of the present specification.

At block 801, the CPU ATU may implement address translation services to support an ATC on the accelerator device.

In block 808, the system may disable CPU ATU on all except one link. For example, in the embodiment of FIG. 7, the ATU may be disabled for all except link PCIe 0. PCIe 0 is selected as an illustrative example here, but it should be understood that the selection of an appropriate link for enabling is an exercise of ordinary skill in the art.

In block 820, the system implements an ATC on the accelerator device, which can be used for translating requests going across all three links. Any miss from the ATC may be serviced via an address translation service request on, for example, PCIe 0.

In block 824, a request 816 from device is received. All requests from the device are looked up on the ATC using the link 0 RID to get the host-physical address.

At block 828, after address translation, the request may be sent over the link with the HPA and a per-link RID. For example, requests over PCIe 0 use {RID0, HPA}. Requests over PCIe 1 use {RID1, HPA}. Requests over PCIe 2 use {RID2, HPA}.

On the CPU side of the link, there may be error detection or routing assumptions built around the RID. This replaces the single RID with link-specific unique RIDs before the request goes to the CPU. This is permissible because the virtualization capabilities on links 1 or 2 may be disabled on the CPU side.

Note that in some embodiments, the same concepts of implementing device-side ATU or ATC can be extended for shared virtual memory flows, such as those that may be used in a distributed system as illustrated in FIG. 4.

Figure 9:
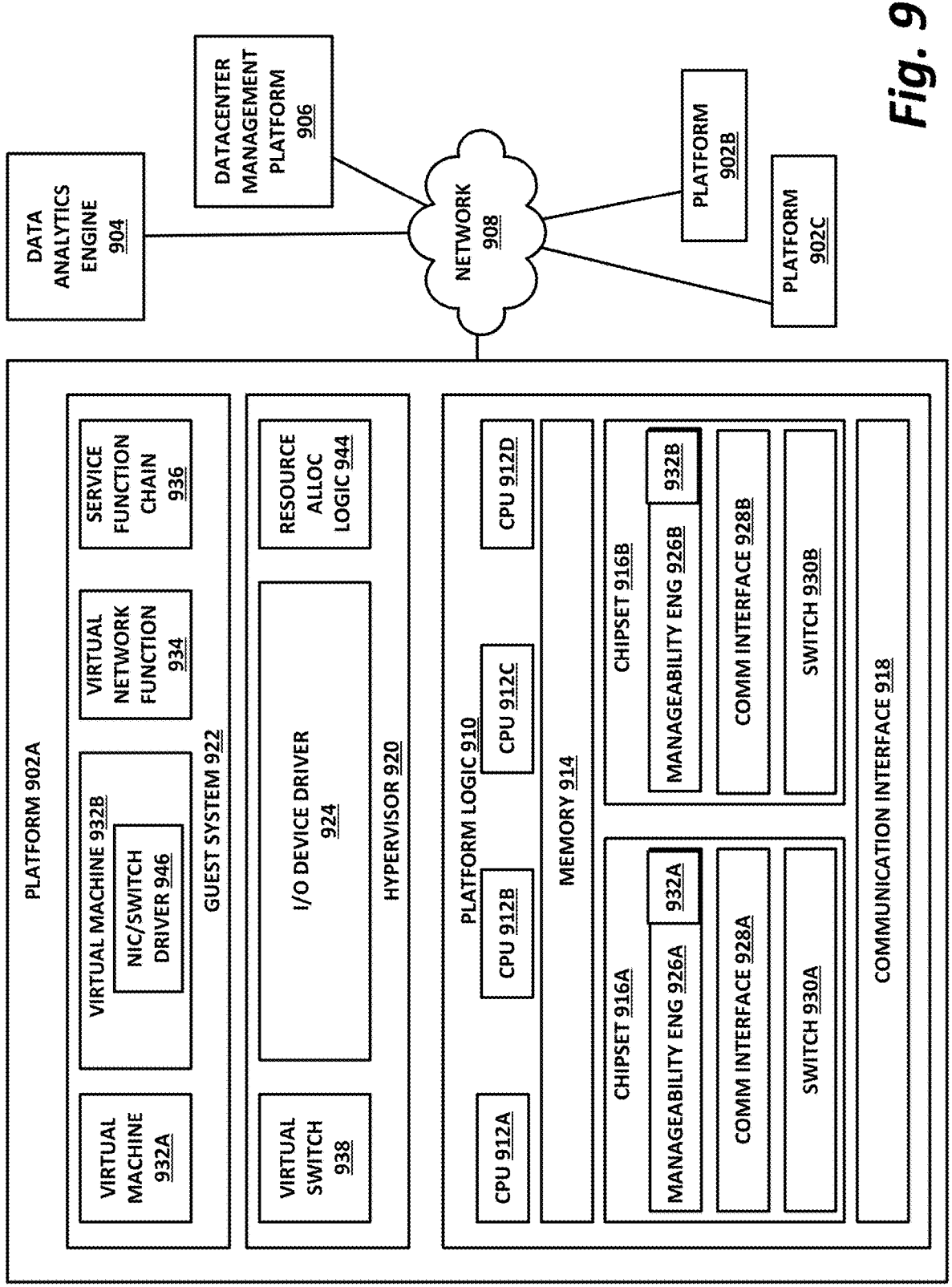
FIG. 9 is a block diagram of components of a computing platform, according to one or more examples of the present specification.

FIG. 9 is a block diagram of components of a computing platform 902A, according to one or more examples of the present specification. Note that embodiments of the computing platform 902A disclosed in this figure may be provided with and benefit from a unified address space for multiple links as described in the present specification. In the embodiment depicted, platforms 902A, 902B, and 902C, along with a data center management platform 906 and data analytics engine 904 are interconnected via network 908. In other embodiments, a computer system may include any suitable number of (i.e., one or more) platforms. In some embodiments (e.g., when a computer system only includes a single platform), all or a portion of the system management platform 906 may be included on a platform 902. A platform 902 may include platform logic 910 with one or more central processing units (CPUs) 912, memories 914 (which may include any number of different modules), chipsets 916, communication interfaces 918, and any other suitable hardware and/or software to execute a hypervisor 920 or other operating system capable of executing workloads associated with applications running on platform 902. In some embodiments, a platform 902 may function as a host platform for one or more guest systems 922 that invoke these applications. Platform 902A may represent any suitable computing environment, such as a high performance computing environment, a data center, a communications service provider infrastructure (e.g., one or more portions of an Evolved Packet Core), an in-memory computing environment, a computing system of a vehicle (e.g., an automobile or airplane), an Internet of Things environment, an industrial control system, other computing environment, or combination thereof.

In various embodiments of the present disclosure, accumulated stress and/or rates of stress accumulated of a plurality of hardware resources (e.g., cores and uncores) are monitored and entities (e.g., system management platform 906, hypervisor 920, or other operating system) of computer platform 902A may assign hardware resources of platform logic 910 to perform workloads in accordance with the stress information. In some embodiments, self-diagnostic capabilities may be combined with the stress monitoring to more accurately determine the health of the hardware resources. Each platform 902 may include platform logic 910. Platform logic 910 comprises, among other logic enabling the functionality of platform 902, one or more CPUs 912, memory 914, one or more chipsets 916, and communication interfaces 928. Although three platforms are illustrated, computer platform 902A may be interconnected with any suitable number of platforms. In various embodiments, a platform 902 may reside on a circuit board that is installed in a chassis, rack, or other suitable structure that comprises multiple platforms coupled together through network 908 (which may comprise, e.g., a rack or backplane switch).

CPUs 912 may each comprise any suitable number of processor cores and supporting logic (e.g., uncores). The cores may be coupled to each other, to memory 914, to at least one chipset 916, and/or to a communication interface 918, through one or more controllers residing on CPU 912 and/or chipset 916. In particular embodiments, a CPU 912 is embodied within a socket that is permanently or removably coupled to platform 902A. Although four CPUs are shown, a platform 902 may include any suitable number of CPUs.

Memory 914 may comprise any form of volatile or nonvolatile memory including, without limitation, magnetic media (e.g., one or more tape drives), optical media, random access memory (RAM), read-only memory (ROM), flash memory, removable media, or any other suitable local or remote memory component or components. Memory 914 may be used for short, medium, and/or long term storage by platform 902A. Memory 914 may store any suitable data or information utilized by platform logic 910, including software embedded in a computer readable medium, and/or encoded logic incorporated in hardware or otherwise stored (e.g., firmware). Memory 914 may store data that is used by cores of CPUs 912. In some embodiments, memory 914 may also comprise storage for instructions that may be executed by the cores of CPUs 912 or other processing elements (e.g., logic resident on chipsets 916) to provide functionality associated with the manageability engine 926 or other components of platform logic 910. A platform 902 may also include one or more chipsets 916 comprising any suitable logic to support the operation of the CPUs 912. In various embodiments, chipset 916 may reside on the same die or package as a CPU 912 or on one or more different dies or packages. Each chipset may support any suitable number of CPUs 912. A chipset 916 may also include one or more controllers to couple other components of platform logic 910 (e.g., communication interface 918 or memory 914) to one or more CPUs. In the embodiment depicted, each chipset 916 also includes a manageability engine 926. Manageability engine 926 may include any suitable logic to support the operation of chipset 916. In a particular embodiment, a manageability engine 926 (which may also be referred to as an innovation engine) is capable of collecting real-time telemetry data from the chipset 916, the CPU(s) 912 and/or memory 914 managed by the chipset 916, other components of platform logic 910, and/or various connections between components of platform logic 910. In various embodiments, the telemetry data collected includes the stress information described herein.

In various embodiments, a manageability engine 926 operates as an out-of-band asynchronous compute agent which is capable of interfacing with the various elements of platform logic 910 to collect telemetry data with no or minimal disruption to running processes on CPUs 912. For example, manageability engine 926 may comprise a dedicated processing element (e.g., a processor, controller, or other logic) on chipset 916, which provides the functionality of manageability engine 926 (e.g., by executing software instructions), thus conserving processing cycles of CPUs 912 for operations associated with the workloads performed by the platform logic 910. Moreover the dedicated logic for the manageability engine 926 may operate asynchronously with respect to the CPUs 912 and may gather at least some of the telemetry data without increasing the load on the CPUs.

A manageability engine 926 may process telemetry data it collects (specific examples of the processing of stress information will be provided herein). In various embodiments, manageability engine 926 reports the data it collects and/or the results of its processing to other elements in the computer system, such as one or more hypervisors 920 or other operating systems and/or system management software (which may run on any suitable logic such as system management platform 906). In particular embodiments, a critical event such as a core that has accumulated an excessive amount of stress may be reported prior to the normal interval for reporting telemetry data (e.g., a notification may be sent immediately upon detection).

Additionally, manageability engine 926 may include programmable code configurable to set which CPU(s) 912 a particular chipset 916 will manage and/or which telemetry data will be collected.

Chipsets 916 also each include a communication interface 928. Communication interface 928 may be used for the communication of signaling and/or data between chipset 916 and one or more I/O devices, one or more networks 908, and/or one or more devices coupled to network 908 (e.g., system management platform 906). For example, communication interface 928 may be used to send and receive network traffic such as data packets. In a particular embodiment, a communication interface 928 comprises one or more physical network interface controllers (NICs), also known as network interface cards or network adapters. A NIC may include electronic circuitry to communicate using any suitable physical layer and data link layer standard such as Ethernet (e.g., as defined by a IEEE 802.3 standard), Fibre Channel, InfiniBand, Wi-Fi, or other suitable standard. A NIC may include one or more physical ports that may couple to a cable (e.g., an Ethernet cable). A NIC may enable communication between any suitable element of chipset 916 (e.g., manageability engine 926 or switch 930) and another device coupled to network 908. In various embodiments a NIC may be integrated with the chipset (i.e., may be on the same integrated circuit or circuit board as the rest of the chipset logic) or may be on a different integrated circuit or circuit board that is electromechanically coupled to the chipset.

In particular embodiments, communication interfaces 928 may allow communication of data (e.g., between the manageability engine 926 and the data center management platform 906) associated with management and monitoring functions performed by manageability engine 926. In various embodiments, manageability engine 926 may utilize elements (e.g., one or more NICs) of communication interfaces 928 to report the telemetry data (e.g., to system management platform 906) in order to reserve usage of NICs of communication interface 918 for operations associated with workloads performed by platform logic 910.

Switches 930 may couple to various ports (e.g., provided by NICs of communication interface 928 and may switch data between these ports and various components of chipset 916 (e.g., one or more Peripheral Component Interconnect Express (PCIe) lanes coupled to CPUs 912). Switches 930 may be a physical or virtual (i.e., software) switch.

Platform logic 910 may include an additional communication interface 918. Similar to communication interfaces 928, communication interfaces 918 may be used for the communication of signaling and/or data between platform logic 910 and one or more networks 908 and one or more devices coupled to the network 908. For example, communication interface 918 may be used to send and receive network traffic such as data packets. In a particular embodiment, communication interfaces 918 comprise one or more physical NICs. These NICs may enable communication between any suitable element of platform logic 910 (e.g., CPUs 912 or memory 914) and another device coupled to network 908 (e.g., elements of other platforms or remote computing devices coupled to network 908 through one or more networks).

Platform logic 910 may receive and perform any suitable types of workloads. A workload may include any request to utilize one or more resources of platform logic 910, such as one or more cores or associated logic. For example, a workload may comprise a request to instantiate a software component, such as an I/O device driver 924 or guest system 922; a request to process a network packet received from a virtual machine 932 or device external to platform 902A (such as a network node coupled to network 908); a request to execute a process or thread associated with a guest system 922, an application running on platform 902A, a hypervisor 920 or other operating system running on platform 902A; or other suitable processing request.

A virtual machine 932 may emulate a computer system with its own dedicated hardware. A virtual machine 932 may run a guest operating system on top of the hypervisor 920. The components of platform logic 910 (e.g., CPUs 912, memory 914, chipset 916, and communication interface 918) may be virtualized such that it appears to the guest operating system that the virtual machine 932 has its own dedicated components.

A virtual machine 932 may include a virtualized NIC (vNIC), which is used by the virtual machine as its network interface. A vNIC may be assigned a media access control (MAC) address or other identifier, thus allowing multiple virtual machines 932 to be individually addressable in a network.

VNF 934 may comprise a software implementation of a functional building block with defined interfaces and behavior that can be deployed in a virtualized infrastructure. In particular embodiments, a VNF 934 may include one or more virtual machines 932 that collectively provide specific functionalities (e.g., wide area network (WAN) optimization, virtual private network (VPN) termination, firewall operations, load-balancing operations, security functions, etc.). A VNF 934 running on platform logic 910 may provide the same functionality as traditional network components implemented through dedicated hardware. For example, a VNF 934 may include components to perform any suitable NFV workloads, such as virtualized evolved packet core (vEPC) components, mobility management entities, 3rd Generation Partnership Project (3GPP) control and data plane components, etc.

SFC 936 is a group of VNFs 934 organized as a chain to perform a series of operations, such as network packet processing operations. Service function chaining may provide the ability to define an ordered list of network services (e.g. firewalls, load balancers) that are stitched together in the network to create a service chain.

A hypervisor 920 (also known as a virtual machine monitor) may comprise logic to create and run guest systems 922. The hypervisor 920 may present guest operating systems run by virtual machines with a virtual operating platform (i.e., it appears to the virtual machines that they are running on separate physical nodes when they are actually consolidated onto a single hardware platform) and manage the execution of the guest operating systems by platform logic 910. Services of hypervisor 920 may be provided by virtualizing in software or through hardware assisted resources that require minimal software intervention, or both. Multiple instances of a variety of guest operating systems may be managed by the hypervisor 920. Each platform 902 may have a separate instantiation of a hypervisor 920.

Hypervisor 920 may be a native or bare-metal hypervisor that runs directly on platform logic 910 to control the platform logic and manage the guest operating systems. Alternatively, hypervisor 920 may be a hosted hypervisor that runs on a host operating system and abstracts the guest operating systems from the host operating system. Hypervisor 920 may include a virtual switch 938 that may provide virtual switching and/or routing functions to virtual machines of guest systems 922. The virtual switch 938 may comprise a logical switching fabric that couples the vNICs of the virtual machines 932 to each other, thus creating a virtual network through which virtual machines may communicate with each other.

Virtual switch 938 may comprise a software element that is executed using components of platform logic 910. In various embodiments, hypervisor 920 may be in communication with any suitable entity (e.g., a SDN controller) which may cause hypervisor 920 to reconfigure the parameters of virtual switch 938 in response to changing conditions in platform 902 (e.g., the addition or deletion of virtual machines 932 or identification of optimizations that may be made to enhance performance of the platform).

Hypervisor 920 may also include resource allocation logic 944, which may include logic for determining allocation of platform resources based on the telemetry data (which may include stress information). Resource allocation logic 944 may also include logic for communicating with various components of platform logic 910 entities of platform 902A to implement such optimization, such as components of platform logic 910.

Any suitable logic may make one or more of these optimization decisions. For example, system management platform 906; resource allocation logic 944 of hypervisor 920 or other operating system; or other logic of computer platform 902A may be capable of making such decisions. In various embodiments, the system management platform 906 may receive telemetry data from and manage workload placement across multiple platforms 902. The system management platform 906 may communicate with hypervisors 920 (e.g., in an out-of-band manner) or other operating systems of the various platforms 902 to implement workload placements directed by the system management platform.

The elements of platform logic 910 may be coupled together in any suitable manner. For example, a bus may couple any of the components together. A bus may include any known interconnect, such as a multi-drop bus, a mesh interconnect, a ring interconnect, a point-to-point interconnect, a serial interconnect, a parallel bus, a coherent (e.g. cache coherent) bus, a layered protocol architecture, a differential bus, or a Gunning transceiver logic (GTL) bus.

Elements of the computer platform 902A may be coupled together in any suitable manner such as through one or more networks 908. A network 908 may be any suitable network or combination of one or more networks operating using one or more suitable networking protocols. A network may represent a series of nodes, points, and interconnected communication paths for receiving and transmitting packets of information that propagate through a communication system. For example, a network may include one or more firewalls, routers, switches, security appliances, antivirus servers, or other useful network devices.

Figure 10:
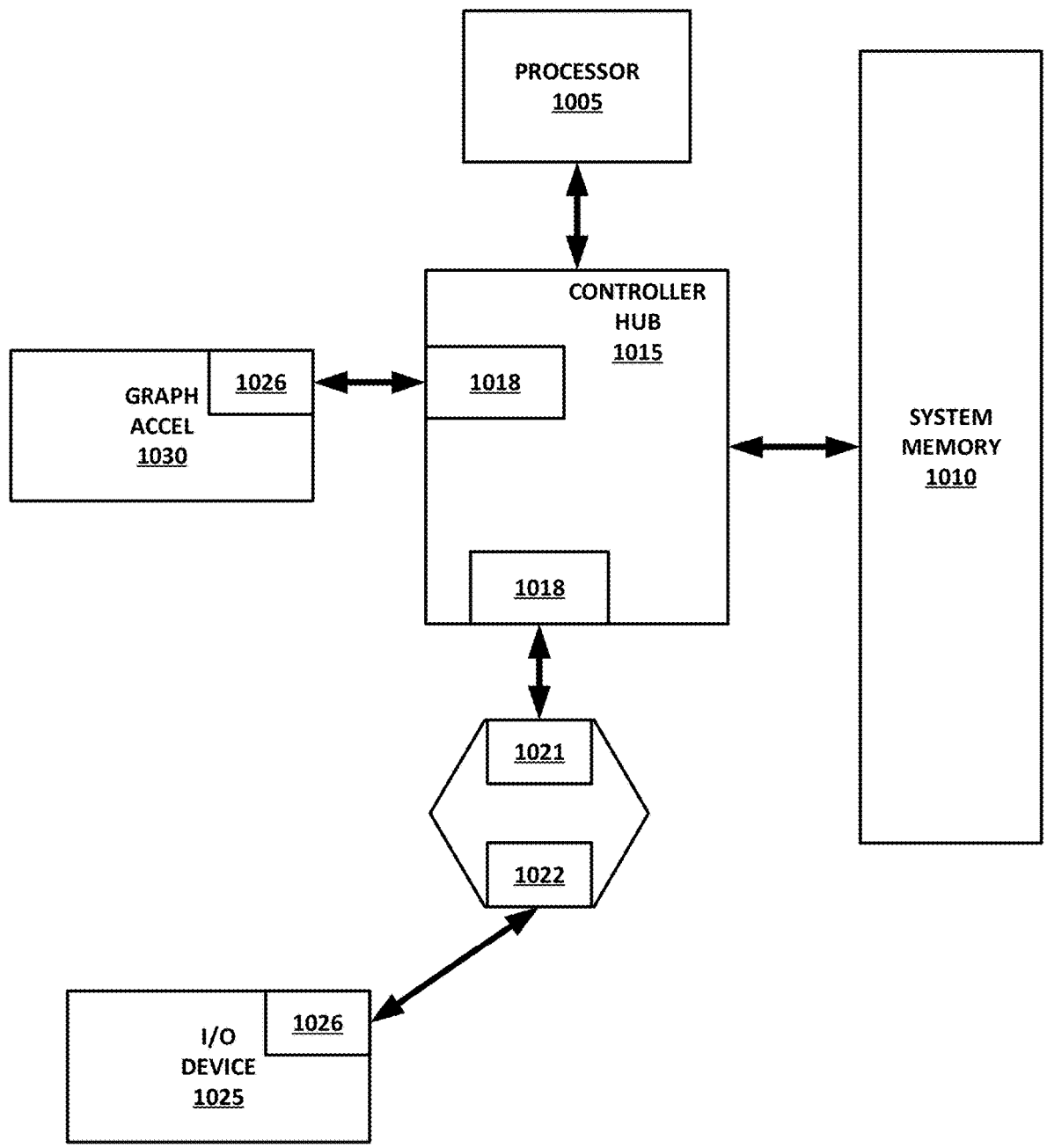
FIG. 10 illustrates an embodiment of a fabric composed of point-to-point links that interconnect a set of components, according to one or more examples of the present specification.

FIG. 10 illustrates an embodiment of a fabric composed of point-to-point links that interconnect a set of components, according to one or more examples of the present specification. Note that embodiments of the fabric disclosed in this figure may be provided with and benefit from a unified address space for multiple links as described in the present specification. System 1000 includes processor 1005 and system memory 1010 coupled to controller hub 1015. Processor 1005 includes any processing element, such as a microprocessor, a host processor, an embedded processor, a coprocessor, or other processor. Processor 1005 is coupled to controller hub 1015 through front-side bus (FSB) 1006. In one embodiment, FSB 1006 is a serial point-to-point interconnect as described below. In another embodiment, link 1006 includes a serial, differential interconnect architecture that is compliant with differential interconnect standards.

System memory 1010 includes any memory device, such as random access memory (RAM), non-volatile (NV) memory, or other memory accessible by devices in system 1000. System memory 1010 is coupled to controller hub 1015 through memory interface 1016. Examples of a memory interface include a double-data rate (DDR) memory interface, a dual-channel DDR memory interface, and a dynamic RAM (DRAM) memory interface.

In one embodiment, controller hub 1015 is a root hub, root complex, or root controller in a Peripheral Component Interconnect Express (PCIe) interconnection hierarchy. Examples of controller hub 1015 include a chipset, a memory controller hub (MCH), a northbridge, an interconnect controller hub (ICH) a southbridge, and a root controller/hub. Often the term chipset refers to two physically separate controller hubs, i.e., a memory controller hub (MCH) coupled to an interconnect controller hub (ICH). Note that current systems often include the MCH integrated with processor 1005, while controller 1015 is to communicate with I/O devices, in a similar manner as described below. In some embodiments, peer-to-peer routing is optionally supported through root complex 1015.

Here, controller hub 1015 is coupled to switch/bridge 1020 through serial link 1019. Input/output modules 1017 and 1021, which may also be referred to as interfaces/ports 1017 and 1021, include/implement a layered protocol stack to provide communication between controller hub 1015 and switch 1020. In one embodiment, multiple devices are capable of being coupled to switch 1020.

Switch/bridge 1020 routes packets/messages from device 1025 upstream, i.e., up a hierarchy towards a root complex, to controller hub 1015 and downstream, i.e., down a hierarchy away from a root controller, from processor 1005 or system memory 1010 to device 1025. Switch 1020, in one embodiment, is referred to as a logical assembly of multiple virtual PCI-to-PCI bridge devices. Device 1025 includes any internal or external device or component to be coupled to an electronic system, such as an I/O device, a network interface controller (NIC), an add-in card, an audio processor, a network processor, a hard-drive, a storage device, a CD/DVD ROM, a monitor, a printer, a mouse, a keyboard, a router, a portable storage device, a Firewire device, a universal serial bus (USB) device, a scanner, and other input/output devices. Often in the PCIe vernacular, such as device is referred to as an endpoint. Although not specifically shown, device 1025 may include a PCIe to PCI/PCI-X bridge to support legacy or other-version PCI devices. Endpoint devices in PCIe are often classified as legacy, PCIe, or root complex integrated endpoints.

Graphics accelerator 1030 is also coupled to controller hub 1015 through serial link 1032. In one embodiment, graphics accelerator 1030 is coupled to an MCH, which is coupled to an ICH. Switch 1020, and accordingly I/O device 1025, is then coupled to the ICH. I/O modules 1031 and 1018 are also to implement a layered protocol stack to communicate between graphics accelerator 1030 and controller hub 1015. Similar to the MCH discussion above, a graphics controller or the graphics accelerator 1030 itself may be integrated in processor 1005.

Figure 11:
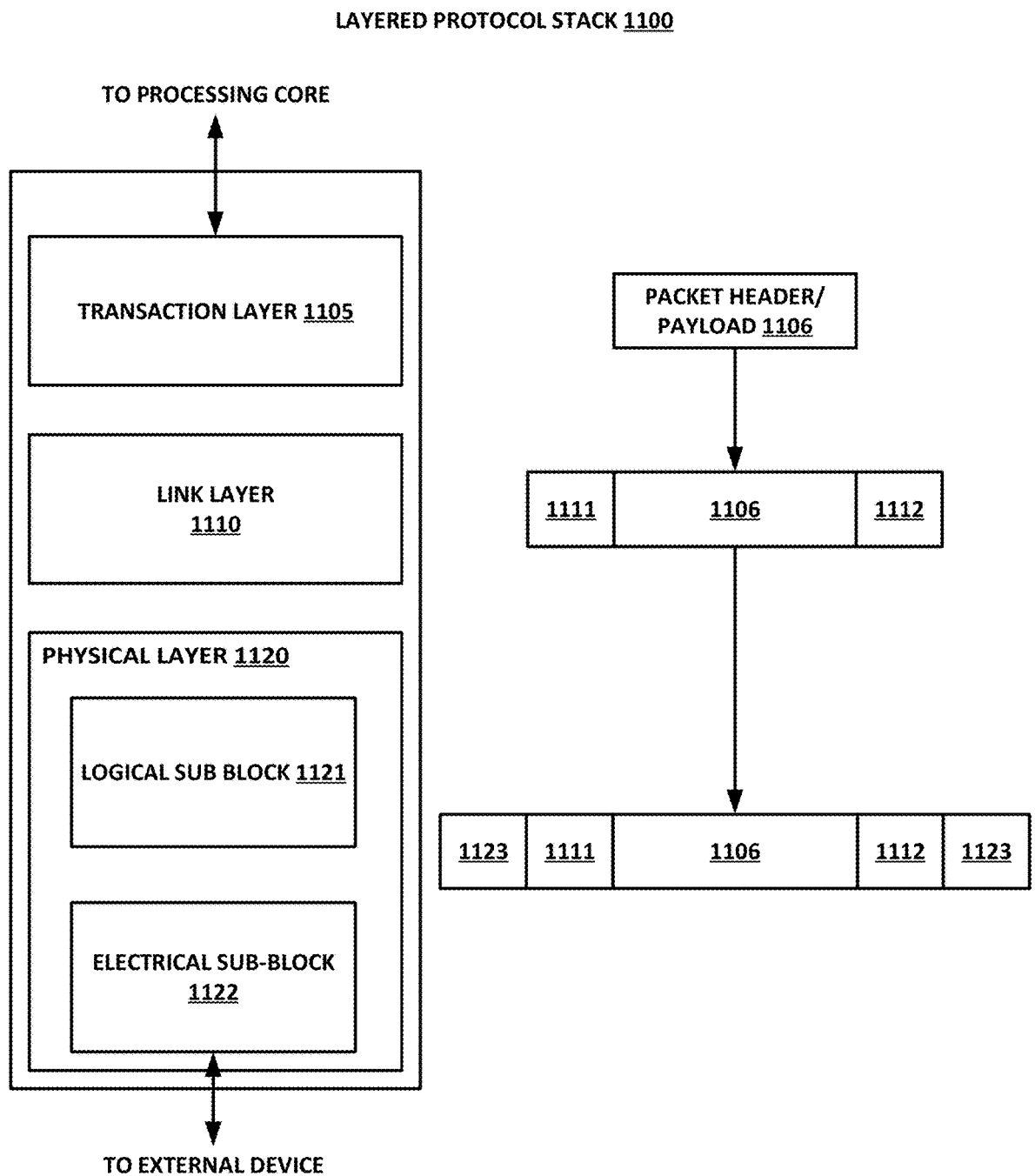
FIG. 11 illustrates an embodiment of a layered protocol stack, according to one or more embodiments of the present specification.

FIG. 11 illustrates an embodiment of a layered protocol stack, according to one or more embodiments of the present specification. Note that embodiments of the layered protocol stack disclosed in this figure may be provided with and benefit from a unified address space for multiple links as described in the present specification. Layered protocol stack 1100 includes any form of a layered communication stack, such as a Quick Path Interconnect (QPI) stack, a PCIe stack, a next generation high performance computing interconnect stack, or other layered stack. Although the discussion immediately below in reference to FIGS. 10-13 is presented in relation to a PCIe stack, the same concepts may be applied to other interconnect stacks. In one embodiment, protocol stack 1100 is a PCIe protocol stack including transaction layer 1105, link layer 1110, and physical layer 1120. An interface, such as interfaces 1017, 1018, 1021, 1022, 1026, and 1031 in FIG. 1, may be represented as communication protocol stack 1100. Representation as a communication protocol stack may also be referred to as a module or interface implementing/including a protocol stack.

PCIe uses packets to communicate information between components. Packets are formed in the transaction layer 1105 and data link layer 1110 to carry the information from the transmitting component to the receiving component. As the transmitted packets flow through the other layers, they are extended with additional information necessary to handle packets at those layers. At the receiving side the reverse process occurs and packets get transformed from their physical layer 1120 representation to the data link layer 1110 representation and finally (for transaction layer packets) to the form that can be processed by the transaction layer 1105 of the receiving device.

Transaction Layer

In one embodiment, transaction layer 1105 is to provide an interface between a device's processing core and the interconnect architecture, such as data link layer 1110 and physical layer 1120. In this regard, a primary responsibility of the transaction layer 1105 is the assembly and disassembly of packets, i.e., transaction layer packets (TLPs). The translation layer 1105 typically manages credit-based flow control for TLPs. PCIe implements split transactions, i.e., transactions with request and response separated by time, allowing a link to carry other traffic while the target device gathers data for the response.

In addition, PCIe utilizes credit-based flow control. In this scheme, a device advertises an initial amount of credit for each of the receive buffers in transaction layer 1105. An external device at the opposite end of the link, such as controller hub 115 in FIG. 1, counts the number of credits consumed by each TLP. A transaction may be transmitted if the transaction does not exceed a credit limit. Upon receiving a response an amount of credit is restored. An advantage of a credit scheme is that the latency of credit return does not affect performance, provided that the credit limit is not encountered.

In one embodiment, four transaction address spaces include a configuration address space, a memory address space, an input/output address space, and a message address space. Memory space transactions include one or more read requests and write requests to transfer data to/from a memory-mapped location. In one embodiment, memory space transactions are capable of using two different address formats, e.g., a short address format, such as a 32-bit address, or a long address format, such as a 64-bit address. Configuration space transactions are used to access configuration space of the PCIe devices. Transactions to the configuration space include read requests and write requests. Message space transactions (or, simply messages) are defined to support in-band communication between PCIe agents.

Therefore, in one embodiment, transaction layer 1105 assembles packet header/payload 1106. Format for current packet headers/payloads may be found in the PCIe specification at the PCIe specification website.

Figure 12:
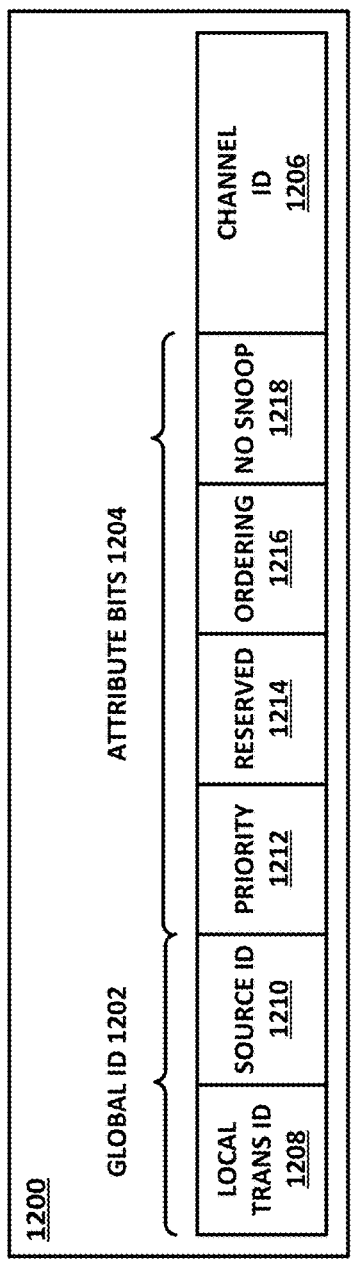
FIG. 12 illustrates an embodiment of a peripheral component interconnect express (PCIe) transaction descriptor, according to one or more examples of the present specification.

FIG. 12 illustrates an embodiment of a PCIe transaction descriptor, according to one or more examples of the present specification. Note that embodiments of the PCIe transaction descriptor disclosed in this figure may be provided with and benefit from a unified address space for multiple links as described in the present specification. In one embodiment, transaction descriptor 1200 is a mechanism for carrying transaction information. In this regard, transaction descriptor 1200 supports identification of transactions in a system. Other potential uses include tracking modifications of default transaction ordering and association of transaction with channels.

Transaction descriptor 1200 includes global identifier field 1202, attributes field 1204 and channel identifier field 1206. In the illustrated example, global identifier field 1202 is depicted comprising local transaction identifier field 1208 and source identifier field 1210. In one embodiment, global transaction identifier 1202 is unique for all outstanding requests.

According to one implementation, local transaction identifier field 1208 is a field generated by a requesting agent, and it is unique for all outstanding requests that require a completion for that requesting agent. Furthermore, in this example, source identifier 1210 uniquely identifies the requestor agent within a PCIe hierarchy. Accordingly, together with source ID 1210, local transaction identifier 1208 field provides global identification of a transaction within a hierarchy domain.

Attributes field 1204 specifies characteristics and relationships of the transaction. In this regard, attributes field 1204 is potentially used to provide additional information that allows modification of the default handling of transactions. In one embodiment, attributes field 1204 includes priority field 1212, reserved field 1214, ordering field 1216, and no-snoop field 1218. Here, priority subfield 1212 may be modified by an initiator to assign a priority to the transaction. Reserved attribute field 1214 is left reserved for future, or vendor-defined usage. Possible usage models using priority or security attributes may be implemented using the reserved attribute field.

In this example, ordering attribute field 1216 is used to supply optional information conveying the type of ordering that may modify default ordering rules. According to one example implementation, an ordering attribute of "0" denotes default ordering rules to apply, wherein an ordering attribute of "1" denotes relaxed ordering, writes can pass writes in the same direction, and read completions can pass writes in the same direction. Snoop attribute field 1218 is utilized to determine if transactions are snooped. As shown, channel ID field 1206 identifies a channel that a transaction is associated with.

Link Layer

Link layer 1110, also referred to as data link layer 1110, acts as an intermediate stage between transaction layer 1105 and the physical layer 1120. In one embodiment, a responsibility of the data link layer 1110 is providing a reliable mechanism for exchanging transaction layer packets (TLPs) between two linked components. One side of the data link layer 1110 accepts TLPs assembled by the transaction layer 1105, applies packet sequence identifier 1111, i.e., an identification number or packet number, calculates and applies an error detection code, i.e., CRC 1112, and submits the modified TLPs to the physical layer 1120 for transmission across a physical to an external device.

Physical Layer

In one embodiment, physical layer 1120 includes logical sub-block 1121 and electrical sub-block 1122 to physically transmit a packet to an external device. Here, logical sub-block 1121 is responsible for the "digital" functions of physical layer 1121. In this regard, the logical sub-block includes a transmit section to prepare outgoing information for transmission by physical sub-block 1122, and a receiver section to identify and prepare received information before passing it to the link layer 1110.

Physical block 1122 includes a transmitter and a receiver. The transmitter is supplied by logical sub-block 1121 with symbols, which the transmitter serializes and transmits onto an external device. The receiver is supplied with serialized symbols from an external device and transforms the received signals into a bit-stream. The bit-stream is de-serialized and supplied to logical sub-block 1121. In one embodiment, an 8b/10b transmission code is employed, where ten-bit symbols are transmitted/received. Here, special symbols are used to frame a packet with frames 1123. In addition, in one example, the receiver also provides a symbol clock recovered from the incoming serial stream.

As stated above, although transaction layer 1105, link layer 1110, and physical layer 1120 are discussed in reference to a specific embodiment of a PCIe protocol stack, a layered protocol stack is not so limited. In fact, any layered protocol may be included/implemented. As an example, a port/interface that is represented as a layered protocol includes: (1) a first layer to assemble packets, i.e., a transaction layer; a second layer to sequence packets, i.e., a link layer; and a third layer to transmit the packets, i.e., a physical layer. As a specific example, a common standard interface (CSI) layered protocol is utilized.

Figure 13:
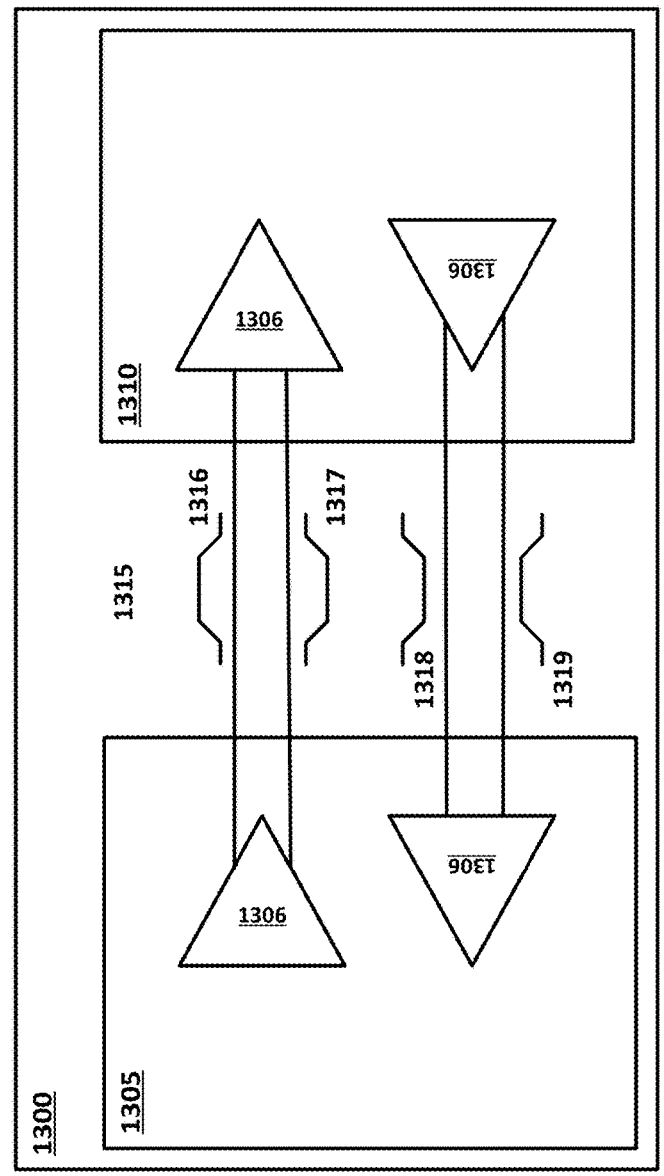
FIG. 13 illustrates an embodiment of a PCIe serial point-to-point fabric, according to one or more examples of the present specification.

FIG. 13 illustrates an embodiment of a PCIe serial point-to-point fabric, according to one or more examples of the present specification. Note that embodiments of the PCIe serial point-to-point fabric disclosed in this figure may be provided with and benefit from a unified address space for multiple links as described in the present specification. Although an embodiment of a PCIe serial point-to-point link is illustrated, a serial point-to-point link is not so limited, as it includes any transmission path for transmitting serial data. In the embodiment shown, a basic PCIe link includes two, low-voltage, differentially driven signal pairs: a transmit pair 1306/1311 and a receive pair 1312/1307. Accordingly, device 1305 includes transmission logic 1306 to transmit data to device 1310 and receiving logic 1307 to receive data from device 1310. In other words, two transmitting paths, i.e., paths 1316 and 1317, and two receiving paths, i.e., paths 1318 and 1319, are included in a PCIe link.

A transmission path refers to any path for transmitting data, such as a transmission line, a copper line, an optical line, a wireless communication channel, an infrared communication link, or other communication path. A connection between two devices, such as device 1305 and device 1310, is referred to as a link, such as link 1315. A link may support one lane—each lane representing a set of differential signal pairs (one pair for transmission, one pair for reception). To scale bandwidth, a link may aggregate multiple lanes denoted by xN, where N is any supported Link width, such as 1, 2, 4, 8, 12, 16, 32, 64, or wider.

A differential pair refers to two transmission paths, such as lines 1316 and 1317, to transmit differential signals. As an example, when line 1316 toggles from a low voltage level to a high voltage level, i.e., a rising edge, line 1317 drives from a high logic level to a low logic level, i.e., a falling edge. Differential signals potentially demonstrate better electrical characteristics, such as better signal integrity, i.e., cross-coupling, voltage overshoot/undershoot, ringing, etc. This allows for a better timing window, which enables faster transmission frequencies.

In one embodiment, a new High Performance Interconnect (HPI) is provided. HPI is a next-generation cache-coherent, link-based interconnect. As one example, HPI may be utilized in high performance computing platforms, such as workstations or servers, where PCIe is typically used to connect accelerators or I/O devices. However, HPI is not so limited. Instead, HPI may be utilized in any of the systems or platforms described herein. Furthermore, the individual ideas developed may be applied to other interconnects, such as PCIe. Moreover, HPI may be extended to compete in the same market as other interconnect, such as PCIe. To support multiple devices, in one implementation, HPI includes an Instruction Set Architecture (ISA) agnostic (i.e., HPI is able to be implemented in multiple different devices). In another scenario, HPI may also be utilized to connect high performance I/O devices, not just processors or accelerators. For example, a high performance PCIe device may be coupled to HPI through an appropriate translation bridge (i.e., HPI to PCIe). Moreover, the HPI links may be utilized many HPI based devices, such as processors, in various ways (e.g. stars, rings, meshes, etc.).

Figure 14:
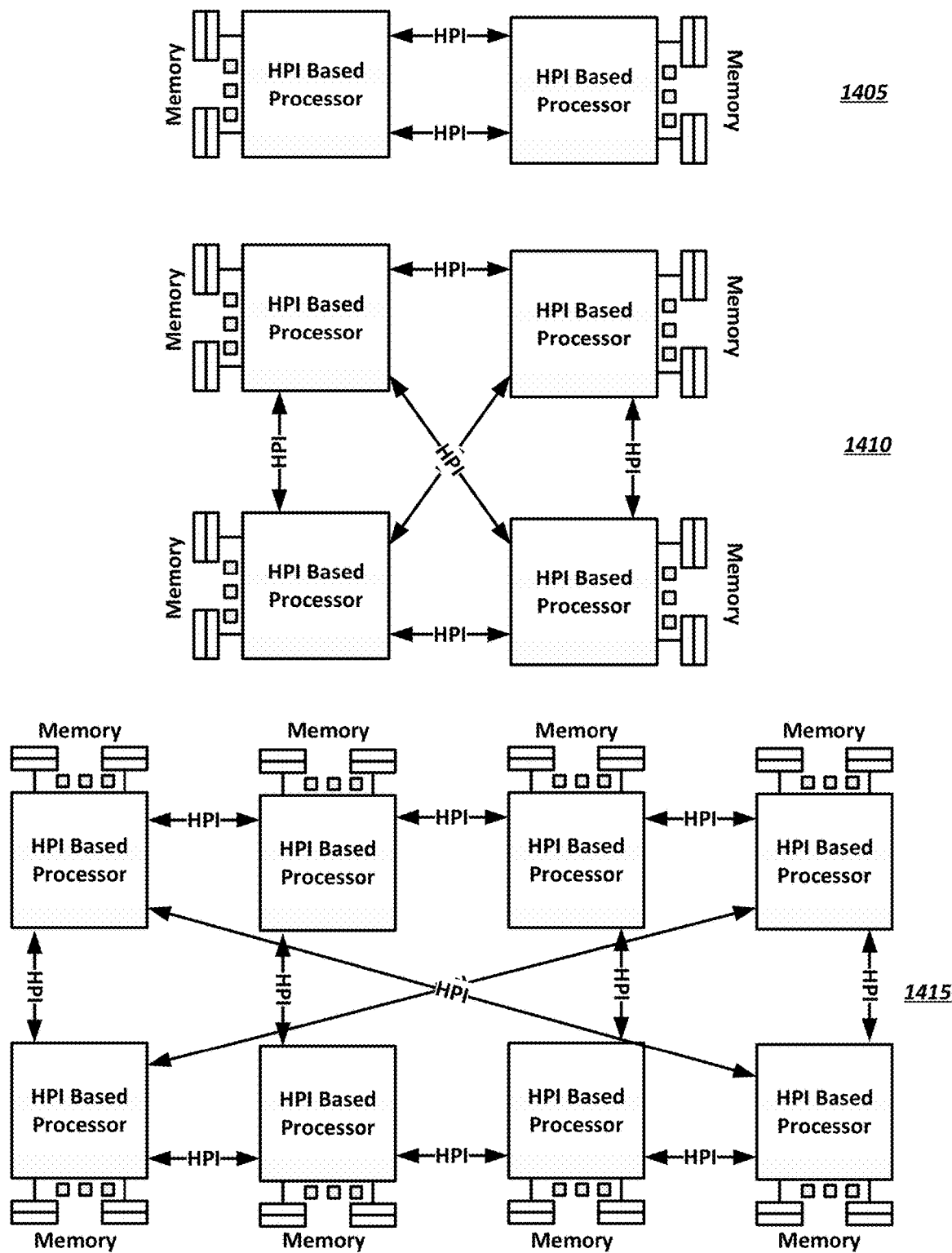
FIG. 14 illustrates an embodiment of multiple potential multi-socket configurations, according to one or more examples of the present specification.

FIG. 14 illustrates an embodiment of multiple potential multi-socket configurations. Note that embodiments of multi-socket configurations disclosed in this figure may be provided with and benefit from a unified address space for multiple links as described in the present specification. A two-socket configuration 1405, as depicted, includes two HPI links; however, in other implementations, one HPI link may be utilized. For larger topologies, any configuration may be utilized as long as an ID is assignable and there is some form of virtual path. As shown 4 socket configuration 1410 has an HPI link from each processor to another. But in the 8 socket implementation shown in configuration 1415, not every socket is directly connected to each other through an HPI link. However, if a virtual path exists between the processors, the configuration is supported. A range of supported processors includes 2-32 in a native domain. Higher number of processors may be reached through use of multiple domains or other interconnects between node controllers.

The HPI architecture includes a definition of a layered protocol architecture, which is similar to PCIe in that it also includes a layered protocol architecture. In one embodiment, HPI defines protocol layers (coherent, non-coherent, and optionally other memory based protocols), a routing layer, a link layer, and a physical layer. Furthermore, as many other interconnect architecture's HPI includes enhancements related to power managers, design for test and debug (DFT), fault handling, registers, security, etc.

Figure 15:
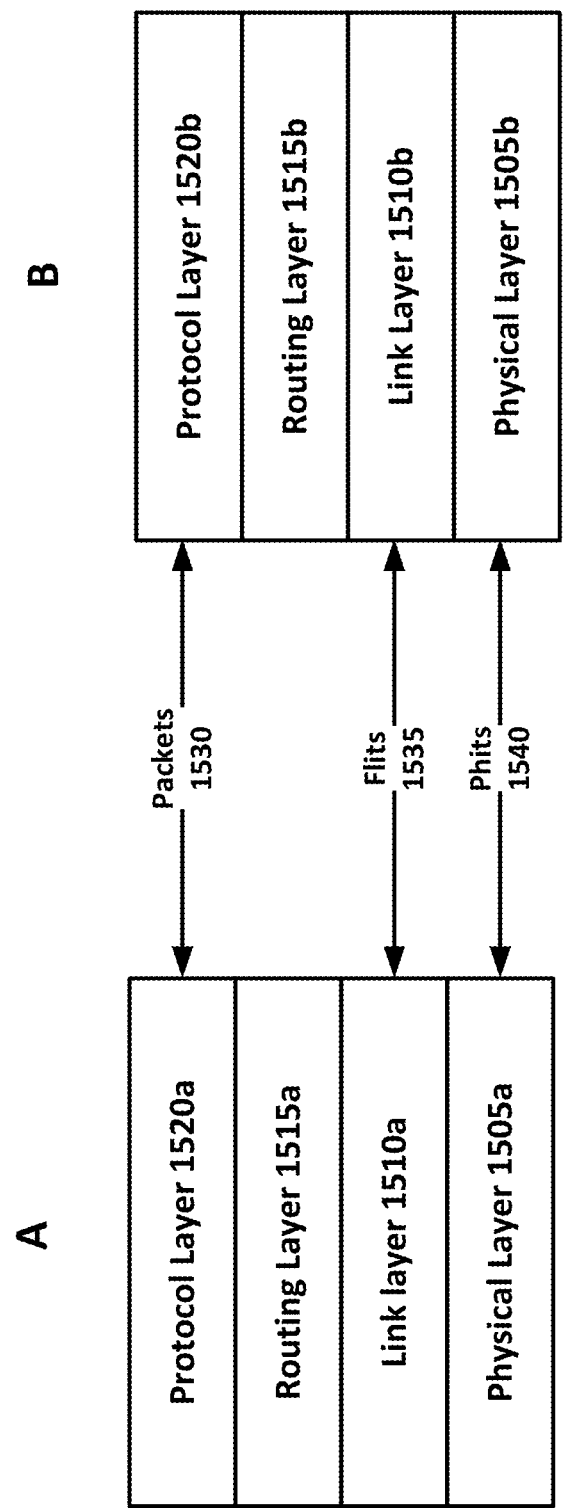
FIG. 15 illustrates an embodiment of a layered stack for a high performance interconnect architecture, according to one or more examples of the present specification.

FIG. 15 illustrates an embodiment of potential layers in the HPI layered protocol stack; however, these layers are not required and may be optional in some implementations. Note that embodiments of potential layers in the HPI layered protocol stack disclosed in this figure may be provided with and benefit from a unified address space for multiple links as described in the present specification. Each layer deals with its own level of granularity or quantum of information (the protocol layer 1505a,b with packets 1530, link layer 1510a,b with flits 1535, and physical layer 1505a,b with phits 1540). Note that a packet, in some embodiments, may include partial flits, a single flit, or multiple flits based on the implementation.

As a first example, a width of a phit 1540 includes a 1 to 1 mapping of link width to bits (e.g. 20 bit link width includes a phit of 20 bits, etc.). Flits may have a greater size, such as 184, 192, or 200 bits. Note that if phit 1540 is 20 bits wide and the size of flit 1535 is 184 bits then it takes a fractional number of phits 1540 to transmit one flit 1535 (e.g. 9.2 phits at 20 bits to transmit an 184 bit flit 1535 or 9.6 at 20 bits to transmit a 192 bit flit). Note that widths of the fundamental link at the physical layer may vary. For example, the number of lanes per direction may include 2, 4, 6, 8, 10, 12, 14, 16, 18, 20, 22, 24, etc. In one embodiment, link layer 1510a,b is capable of embedding multiple pieces of different transactions in a single flit, and within the flit multiple headers (e.g. 1, 2, 3, 4) may be embedded within the flit. Here, HPI splits the headers into corresponding slots to enable multiple messages in the flit destined for different nodes.

Physical layer 1505a,b, in one embodiment, is responsible for the fast transfer of information on the physical medium (electrical or optical etc.). The physical link is point to point between two Link layer entities, such as layer 1505a and 1505b. The Link layer 1510a,b abstracts the Physical layer 1505a,b from the upper layers and provides the capability to reliably transfer data (as well as requests) and manage flow control between two directly connected entities. It also is responsible for virtualizing the physical channel into multiple virtual channels and message classes. The Protocol layer 1520a,b relies on the Link layer 1510a,b to map protocol messages into the appropriate message classes and virtual channels before handing them to the Physical layer 1505a,b for transfer across the physical links. Link layer 1510a,b may support multiple messages, such as a request, snoop, response, writeback, non-coherent data, etc.

In one embodiment, to provide reliable transmission cyclic redundancy check (CRC) error checking and recovery procedures are provided by the Link layer 1510a,b in order to isolate the effects of routine bit errors that occur on the physical interconnect. The Link layer 1510a generates the CRC at the transmitter and checks at the receiver Link layer 1510b.

In some implementations, link layer 1510a,b utilized a credit scheme for flow control. During initialization, a sender is given a set number of credits to send packets or flits to a receiver. Whenever a packet or flit is sent to the receiver, the sender decrements its credit counters by one credit which represents either a packet or a flit, depending on the type of virtual network being used. Whenever a buffer is freed at the receiver, a credit is returned back to the sender for that buffer type. When the sender's credits for a given channel have been exhausted, in one embodiment, it stops sending any flits in that channel. Essentially, credits are returned after the receiver has consumed the information and freed the appropriate buffers.

In one embodiment, routing layer 1515a,b provides a flexible and distributed way to route packets from a source to a destination. In some platform types (for example, uniprocessor and dual processor systems), this layer may not be explicit but could be part of the Link layer 1510a,b; in such a case, this layer is optional. It relies on the virtual network and message class abstraction provided by the Link Layer 1510a,b as part of the function to determine how to route the packets. The routing function, in one implementation, is defined through implementation specific routing tables. Such a definition allows a variety of usage models.

In one embodiment, protocol layer 1520a,b implement the communication protocols, ordering rule, and coherency maintenance, I/O, interrupts, and other higher-level communication. Note that protocol layer 1520a,b, in one implementation provides messages to negotiate power states for components and the system. As a potential addition, physical layer 1505a,b may also independently or in conjunction set power states of the individual links.

Multiple agents may be connect to an HPI architecture, such as a home agent (orders requests to memory), caching (issues requests to coherent memory and responds to snoops), configuration (deals with configuration transactions), interrupt (processes interrupts), legacy (deals with legacy transactions), non-coherent (deals with non-coherent transactions), and others. More specific discussion of the layers for HPI are discussed below.

An overview of a few potential features of HPI includes: not utilizing pre-allocation at home nodes; no ordering requirements for a number of message classes; packing multiple messages in a single flit (protocol header) (i.e., a packed flit that can hold multiple messages in defined slots); a wide link that may scale from 4, 8, 16, 20, or more lanes; a large error checking scheme that may utilize 8, 16, 32, or as much as 64 bits for error protection; and utilizing an embedded clocking scheme.

HPI Physical Layer

The Physical layer 1505a,b (or PHY) of HPI rests above the electrical layer (i.e., electrical conductors connecting two components) and below the link layer 1510a,b, as illustrated in FIG. 15. The physical layer resides on each agent and connects the link layers on two agents (A and B) separated from each other. The local and remote electrical layers are connected by physical media (e.g. wires, conductors, optical, etc.). The physical layer 1505a,b, in one embodiment, has two major phases, initialization and operation. During initialization, the connection is opaque to the link layer and signaling may involve a combination of timed states and handshake events. During operation, the connection is transparent to the link layer and signaling is at a speed, with all lanes operating together as a single link. During the operation phase, the physical layer transports flits from agent A to agent B and from agent B to agent A. The connection is also referred to as a link and abstracts some physical aspects including media, width and speed from the link layers while exchanging flits and control/status of current configuration (e.g. width) with the link layer. The initialization phase includes minor phases e.g. Polling, Configuration. The operation phase also includes minor phases (e.g. link power management states).

In one embodiment, physical layer 1505a,b is also: to meet a reliability/error standard, tolerate a failure of a lane on a link and go to a fraction of nominal width, tolerate single failures in opposite direction of a link, support hot add/remove, enabling/disabling PHY ports, timeout initialization attempts when the number of attempts has exceeded a specified threshold etc.

In one embodiment, HPI utilizes a rotating bit pattern. For example when a flit size is not aligned with a multiple of the lanes in an HPI link, the flit may not be able to be sent in an integer multiple of transmissions over the lanes (e.g. a 192-bit flit is not a clean multiple of an exemplary 20 lane link. So at x20 flits may be interleaved to avoid wasting bandwidth (i.e., sending a partial flit at some point without utilizing the rest of the lanes). The interleaving, in one embodiment, is determined to optimize latency of key fields and multiplexers in the transmitter (Tx) and receiver (Rx). The determined patterning also potentially provides for clean and quick transitioning to/from a smaller width (e.g., ×8) and seamless operation at the new width.

In one embodiment, HPI utilizes an embedded clock, such as a 20 bit embedded clock or other number of bit embedded clock. Other high performance interfaces may use a forwarded clock or other clock for in-band reset. By embedding clock in HPI, it potentially reduces pinout. However, using an embedded clock, in some implementations, may result in different apparatus and methods to handle in-band reset. As a first, example a blocking link state to hold off link flit transmission and allow PHY usage (described in more detail in the Appendix A) is utilized after initialization. As a second example, electrical ordered sets, such as an electrically idle ordered set (EIOS) may be utilized during initialization.

In one embodiment, HPI is capable of utilizing a first bit width direction without a forwarded clock and a second, smaller bit width link for power management. As an example, HPI includes a partial link width transmitting state, where a partial width is utilized (e.g. a x20 full width and a ×8 partial width); however, the widths are purely illustrative and may differ. Here, the PHY may handle partial width power management without link layer assist or intervention. In one embodiment, a blocking link state (BLS) protocol is utilized to enter the partial width transmitting state (PWTS). PWTS exit, in one or more implementations, may use the BLS protocol or squelch break detection. Due to absence of a forwarded clock, PWTLS exit may include a re-deskew, which maintains determinism of the link.

In one embodiment, HPI utilizes Tx adaptation. As an example, loopback state and hardware is used for Tx Adaptation. As on example, HPI is capable of counting actual bit errors; this may be able to be performed by injecting specialized patterns. As a result, HPI should be able to get better electrical margins at lower power. When using the loopback state, one direction may be used as a hardware backchannel with metrics sent as part of a training sequence (TS) payload.

In one embodiment, HPI is able to provide latency fixing without exchanging sync counter values in a TS. Other interconnect may perform latency fixing based on such exchanging of a sync counter value in each TS. Here, HPI may utilize periodically recurring Electrically Idle Exit Ordered Sets (EIEOS) as a proxy for the sync counter value by aligning the EIEOS to the sync counter. This potentially saves TS payload space, removes aliasing, and DC balance concerns, as well as simplify the calculation of latency to be added.

In one embodiment, HPI provides for software and timer control of a link state machine transitions. Other interconnect may support a semaphore (hold bit) that is set by hardware on entering an initialization state. Exit from the state occurs when the hold bit is cleared by software. HPI, in one implementation, allows software to control this type of mechanism for entering a transmitting link state or a loop back pattern state. In one embodiment, HPI allows for exit from handshake sates to be based on a software programmable timeout after handshake, which potentially makes test software easier.

In one embodiment, HPI utilizes Pseudo Random Bit Sequence (PRBS) scrambling of TS. As an example a 23-bit PRBS is utilized (PRBS23). In one embodiment, the PRBS is generated by a similar bit size, self-seeded storage element, such as a linear feedback shift register. As one example, a fixed UI pattern may be utilized to scramble with a bypass to an adaptation state. But by scrambling TS with PRBS23, Rx adaptation may be performed without the bypass. In addition, offset and other errors may be reduced during clock recovery and sampling. The HPI approach relies on using Fibonacci LFSRs which can be self-seeded during specific portions of the TS.

In one embodiment, HPI supports an emulated slow mode without changing PLL clock frequency. Some designs may use separate PLLs for slow and fast speed. Yet, in on implementation, HPI use emulated slow mode (i.e., PLL clock runs at fast speed; TX repeats bits multiple times; RX oversamples to locate edges and identify the bit.). This means that ports sharing a PLL may coexist at slow and fast speeds. In one example where the multiple is an integer ratio of fast speed to slow speed, different fast speeds may work with the same slow speed, which may be used during the discovery phase of hot attach.

In one embodiment, HPI supports a common slow mode frequency for hot attach. Emulated slow mode, as described above, allows HPI ports sharing a PLL to coexist at slow and fast speeds. When a designer sets the emulation multiple as an integer ratio of fast speed to slow speed, then different fast speeds may work with the same slow speed. So, two agents which support at least one common frequency may be hot attached irrespective of the speed at which the host port is running. Software discovery may then use the slow mode link to identify and setup the most optimal link speeds.

In one embodiment, HPI supports re-initialization of link without termination changes. One could provide re-initialization on an in-band reset having clock lane terminations changed for the discovery process used in reliability, availability, and serviceability (RAS). In one embodiment, re-initialization for HPI may be done without changing the termination values when HPI includes a RX screening of incoming signaling to identify good lanes.

In one embodiment, HPI supports robust low power link state (LPLS) entry. As an example, HPI may include a minimum stay in LPLS (i.e., a minimum amount of time, UI, counter value, etc. that a link stays in LPLS before an exit). Alternatively, LPLS entry may be negotiated and then use an in-band reset to enter LPLS. But this may mask an actual in-band reset originating from the second agent in some cases. HPI, in some implementations, allows a first agent to enter LPLS and a second agent to enter Reset. The first agent is unresponsive for a time period (i.e., the minimum stay), which allows the second agent to complete reset and then wake up the first agent, enabling a much more efficient, robust entry into LPLS.

In one embodiment, HPI supports features such as debouncing detect, wake and continuous screening for lane failures. HPI may look for a specified signaling pattern for an extended period of time to detect a valid wake from a LPLS thus reducing the chances of a spurious wake. The same hardware may also be used in the background for continuously screening for bad lanes during the initialization process making for a more robust RAS feature.

In one embodiment, HPI supports a deterministic exit for lock step and restart-replay. In HPI, some TS boundaries may coincide with flit boundaries when operating at full width. So HPI may identify and specify the exit boundaries such that lock-step behavior may be maintained with another link. In addition, HPI may specify timers which may be used to maintain lock step with a link pair. After initialization, HPI may also support operation with in-band resets disabled to support some flavors of lock-step operation.

In one embodiment, HPI supports use of TS header instead of payload for key initialization parameters. Alternatively, TS payload may be used to exchange unit parameters like ACKs and lane numbers. And DC levels for communicating lane polarity may also be used. Yet, HPI may use DC balanced codes in the TS header for key parameters. This potentially reduces the number of bytes needed for a payload and potentially allows for an entire PRBS23 pattern to be used for scrambling TS, which reduces the need for DC balancing the TS.

In one embodiment, HPI supports measures to increase noise immunity of active lanes during partial width transmitting link state (PWTLS) entry/exit of idle lanes. In one embodiment, null (or other non-retryable flits) flits may be used around the width change point to increase noise immunity of active lanes. Additionally, HPI may utilize null flits around the start of PWTLS exit (i.e., the null flits may be broken up with data flits). HPI may also use specialized signaling, whose format may be varied to reduce chances of false wake detects.

In one embodiment, HPI supports use of specialized patterns during PWTLS exit to allow non-blocking deskew. Alternatively, idle lanes may not be deskewed on PWTLS exit since they may maintain skew with help of a forwarded clock. Yet, with use of an embedded clock, HPI may use specialized signaling, whose format may be varied to reduce chances of false wake detects and also allow for deskew without blocking flit flow. This also allows for more robust RAS by seamlessly powering down failing lanes, re-adapting them, and bringing them back online without blocking the flow of flits.

In one embodiment, HPI supports low power link state (LPLS) entry without link layer support and more robust LPLS exit. Alternatively, link layer negotiation may be depended on between pre-designated master and slave to enter LPLS from transmitting link state (TLS). In HPI, the PHY may handle negotiation using blocking link state (BLS) codes and may support both agents being masters or initiators, as well as entry into LPLS directly from PWTLS. Exit from LPLS may be based on debouncing a squelch break using a specific pattern followed by handshake between the two sides and a timeout induced in-band reset if any of this fails.

In one embodiment, HPI supports controlling unproductive looping during initialization. Alternatively, a failure to init (e.g. lack of good lanes) may result in retrying the init too many times, which potentially wastes power and is difficult to debug. In HPI, the link-pair may try to init a set number of times before calling it quits and powering down in a reset state, where software may make adjustments before retrying the init. This potentially improves the RAS of the system.

In one embodiment, HPI supports advanced IBIST (interconnect built in self-test) options. In one embodiment, a pattern generator may be utilized, which allows for two non-correlated PRBS23 patterns of maximum length for any pin. In one embodiment, HPI may be able to support four such patterns, as well as provide the ability to control the length of these patterns (i.e., dynamically vary test pattern, PRBS23 length).

In one embodiment, HPI provides advanced logic to deskew lanes. As an example, the TS boundary after TS lock may be used to deskew the lanes. In addition, HPI may deskew by comparing lane PRBS patterns in the LFSR during specific points in the payload. Such deskew might be useful in test chips, which may lack ability to detect TS or state machines to manage the deskew.

In one embodiment, exit from init to link transmitting occurs on a TS boundary with planetary alignment. In addition, HPI may support a negotiated delay from that point. In addition, the order of exit between the two directions may be controlled by using master-slave determinism allowing for one instead of two planetary alignment controls for the link pair.

Some implementations use a fixed 128 UI pattern to scramble TS. Others use a fixed 4 k PRBS23 to scramble TS. HPI, in one embodiment, allows for using any length PRBS including an entire (8M-1) PRBS23 sequence.

In some architectures adaptation is of fixed duration. In one embodiment, the exit from Adapt is handshaked rather than timed. This means that Adapt times may be asymmetric between the two directions and as long as needed by either side.

In one embodiment, a state machine may bypass states if those state actions don't need to be redone. However, this may lead to more complex designs and validation escapes. HPI doesn't use bypasses—instead it distributes actions such that short timers in each state may be used to perform the actions and bypasses avoided. This potentially makes for more uniform and synchronized state machine transitions.

In some architectures, forwarded clock is utilized for in-band reset and link layer for staging partial width transmitting and for low power link entry. HPI uses block linking state codes similar functions. These codes potentially could have bit errors leading to 'mismatches' at Rx. HPI includes a protocol for dealing with mismatches as well as means to handle asynchronous reset, low power link state and partial width link state requests.

In one embodiment, a 128 UI scrambler is utilized for loopback TS. However, this can lead to aliasing for TS lock when loopback begins; so some architecture's changes the payload to all Os during this. In another embodiment, HPI utilizes a uniform payload and uses the periodically occurring unscrambled EIEOS for TS lock.

Some architecture utilize scrambled TS during init. In one embodiment, HPI defines supersequences that are combinations of scrambled TS of various lengths and unscrambled EIEOS. This allows more randomized transitions during init and also simplifies TS lock, latency fixing, and other actions.

HPI Link Layer

Returning to FIG. 15, an embodiment of a logical block for link layer 1510a,b is illustrated. In one embodiment, Link Layer 1510a,b guarantees reliable data transfer between two protocol or routing entities. It abstracts Physical layer 1505a,b from the Protocol layer 1520a,b, is responsible for the flow control between two protocol agents (A, B), and provides virtual channel services to the Protocol layer (Message Classes) and Routing layer (Virtual Networks). The interface between the Protocol layer 1520a,b and the Link Layer 1510a,b is typically at the packet level. In one embodiment, the smallest transfer unit at the Link Layer is referred to as a flit which a specified number of bits, such as 192. The Link Layer 1510a,b relies on the Physical layer 1505a,b to frame the Physical layer 1505a,b's unit of transfer (phit) into the Link Layer 1510a,b' unit of transfer (flit). In addition, the Link Layer 1510a,b may be logically broken into two parts, a sender and a receiver. A sender/receiver pair on one entity may be connected to a receiver/sender pair on another entity. Flow Control is often performed on both a flit and a packet basis. Error detection and correction is also potentially performed on a flit level basis.

In one embodiment, flits are expanded 192 bits. However, any range of bits, such as 81-256 (or more) may be utilized in different variations. Here, the CRC field is also increased (e.g. 16 bits) to handle a larger payload.

In one embodiment, TIDs (Transaction IDs) are 11 bits in length. As a result, pre-allocation and the enabling of distributed home agents may be removed. Furthermore, use of 11 bits, in some implementations, allows for the TID to be used without having use for an extended TID mode.

In one embodiment, header flits are divided into 3 slots, 2 with equal size (Slots 0 and 1) and another smaller slot (Slot 2). A floating field may be available for one of Slot 0 or 1 to use. The messages that can use slot 1 and 2 are optimized, reducing the number of bits needed to encode these slots' opcodes. When a header needing more bits that Slot 0 provides enters the link layer, slotting algorithms are in place to allow it to take over Slot 1 payload bits for additional space. Special control (e.g. LLCTRL) flits may consume all 3 slots worth of bits for their needs. Slotting algorithms may also exist to allow individual slots to be utilized while other slots carry no information, for cases where the link is partially busy. Other interconnect may allow a single message per flit, instead of multiple. The sizing of the slots within the flit, and the types of messages that can be placed in each slot, potentially provide the increased bandwidth of HPI even with a reduced flit rate. For a more detailed description of flits and the multi-slot header, refer to the flit definition section of Appendix B.

In HPI, a large CRC baseline may improve error detection. For example, a 16 bit CRC is utilized. As a result of the larger CRC, a larger payload may also be utilized. The 16 bits of CRC in combination with a polynomial used with those bits improves error detection. As an example, the are a minimum number of gates to provide 1) 1-4 bit errors detected 2) errors of burst length 16 or less are detected.

In one embodiment, a rolling CRC based on two CRC-16 equations is utilized. Two 16 bit polynomials may be used, the polynomial from HPI CRC-16 and a second polynomial. The second polynomial has the smallest number of gates to implement while retaining the properties of 1) all 1-7 bit errors detected 2) per lane burst protection in ×8 link widths 3) all errors of burst length 16 or less are detected.

In one embodiment, a reduced max flit rate (9.6 versus 4 UI) is utilized, but increased throughput of the link is obtained. As a result of the increased flit size, introduction of multiple slots per flit, optimized utilization of payload bits (changed algorithms to remove or relocate infrequently used fields), more interconnect efficiency is achieved.

In one embodiment, part of the support for 3 slots includes 192 bit flit. The floating field enables 11 extra bits of payload for either slot 0 or slot 1. Note if a larger flit is used more floating bits may be used. And as a corollary, if a smaller flit is used, then less floating bits are provided. By allowing a field to float between the two slots, we can provide the extra bits needed for certain messages, while still staying within 192 bits and maximizing the utilization of the bandwidth. Alternatively, providing an 11 bit HTID field to each slot may use an extra 11 bits in the flit which would not be as efficiently utilized.

Some interconnects may transmit Viral status in protocol level messages and Poison status in data flits. In one embodiment, HPI protocol level messages and Poison status are moved to control flits. Since these bits are infrequently used (only in the case of errors), removing them from the protocol level messages potentially increases flit utilization. Injecting them using control flits still allows containment of the errors.

In one embodiment, CRD and ACK bits in a flit allow return of a number of credits, such as eight, or the number of acks, such as 8. As part of the fully encoded credit fields, these bits are utilized as Credit[n] and Acknowledge[n] when Slot 2 is encoded as LLCRD. This potentially improves efficiency by allowing any flit to return the number of VNA Credits and the number of Acknowledges using a total of only 2 bits, but also allowing their definitions to remain consistent when a fully encoded LLCRD return is used.

In one embodiment, VNA vs. VN0/1 encoding (saves bits by aligning slots to same encoding). The slots in a multi-slot header flit may be aligned to just VNA, just VN0, or just VN1. By enforcing this, per slot bits indicating VN are removed. This increases the efficiency of flit bit utilization and potentially enables expanding from 10 bit TIDs to 11 bit TIDs.

Some fields only allow return in increments of 1 (for VN0/1), 2/8/16 (for VNA), and 8 (for Acknowledge). This means that returning a large number of pending Credits or Acknowledges may use multiple return messages. It also means that odd numbered return values for VNA and Acknowledge may be left stranded pending accumulation of an evenly divisible value. HPI may have fully encoded Credit and Ack return fields, allowing an agent to return all accumulated Credits or Acks for a pool with a single message. This potentially improves link efficiency and also potentially simplifies logic implementation (return logic can implement a "clear" signal rather than a full decrementer).

Routing Layer

In one embodiment, Routing layer 1515a,b provides a flexible and distributed method to route HPI transactions from a source to a destination. The scheme is flexible since routing algorithms for multiple topologies may be specified through programmable routing tables at each router (the programming in one embodiment is performed by firmware, software, or a combination thereof). The routing functionality may be distributed; the routing may be done through a series of routing steps, with each routing step being defined through a lookup of a table at either the source, intermediate, or destination routers. The lookup at a source may be used to inject a HPI packet into the HPI fabric. The lookup at an intermediate router may be used to route an HPI packet from an input port to an output port. The lookup at a destination port may be used to target the destination HPI protocol agent. Note that the Routing layer, on some implementations, is thin since the routing tables, and, hence the routing algorithms, are not specifically defined by specification. This allows a variety of usage models, including flexible platform architectural topologies to be defined by the system implementation. The Routing layer 1515a,b relies on the Link layer 1510a,b for providing the use of up to three (or more) virtual networks (VNs)—in one example, two deadlock-free VNs, VN0 and VN1 with several message classes defined in each virtual network. A shared adaptive virtual network (VNA) may be defined in the link layer, but this adaptive network may not be exposed directly in Routing Concepts, since each Message class and VN may have dedicated resources and guaranteed forward progress.

A non-exhaustive, exemplary list of routing rules includes: (1) (Message class invariance): An incoming packet belonging to a particular message class may be routed on an outgoing HPI port/virtual network in the same message class; (2) (Switching) HPI platforms may support the "store-and-forward" and "virtual cut through" types of switching. In another embodiment, HPI may not support "wormhole" or "circuit" switching. (3) (Interconnect deadlock freedom) HPI platforms may not rely on adaptive flows for deadlock-free routing. With platforms, which use both VN0 and VN1, the 2 VNs together may be used for deadlock-free routing; and (4) (VN0 for "leaf" routers). In HPI platforms, which may use both VN0 and VN1, it is permissible to use VN0 for those components, whose routers are not used route-through; that is, incoming ports have HPI destinations that terminate at this component. In such a case, packets from different VNs can be routed to VN0. Other rules (for example, movement of packets between VN0 and VN1) may be governed by a platform dependent routing algorithm.

Routing step: A routing step, in one embodiment, is referred to by a routing function (RF) and a selection function (SF). The routing function may take, as inputs, a HPI port at which a packet arrives and a destination NodeID; it then yields as output a 2-tuple—the HPI port number and the virtual network—which the packet should follow on its path to the destination. It is permitted for the routing function to be additionally dependent on the incoming virtual network. Further, it is permitted with the routing step to yield multiple <port #, virtual network> pairs. The resulting routing algorithms are called adaptive. In such a case, a selection function SF may choose a single 2-tuple based on additional state information which the router has (for example, with adaptive routing algorithms, the choice of a particular port of virtual network may depend on the local congestion conditions). A routing step, in one embodiment, consists of applying the routing function and then the selection function to yield the 2-tuple(s).

Router Table Simplifications: HPI platforms may implement legal subsets of the virtual networks. Such subsets simplify the size of the routing table (reduce the number of columns) associated virtual channel buffering and arbitration at the router switch. These simplifications may come at the cost of platform flexibility and features. VN0 and VN1 may be deadlock-free networks which provide deadlock freedom either together or singly, depending on the usage model, usually with minimal virtual channel resources assigned to them. Flat organization of the routing table may include a size corresponding to the maximum number of NodeIDs. With such an organization, the routing table may be indexed by the destination NodeID field and possibly by the virtual network id field. The table organization can also be made hierarchical with the destination NodeID field being sub-divided into multiple subfields, which is implementation dependent. For example, with a division into "local" and "non-local" parts, the "non-local" part of the routing is completed before the routing of the "local" part. The potential advantage of reducing the table size at every input port comes at the potential cost of being forced to assign NodeIDs to HPI components in a hierarchical manner Routing Algorithm: A routing algorithm, in one embodiment, defines the set of permissible paths from a source module to a destination module. A particular path from the source to the destination is a subset of the permissible paths and is obtained as a series of routing steps defined above starting with the router at the source, passing through zero or more intermediate routers, and ending with the router at the destination. Note that even though an HPI fabric may have multiple physical paths from a source to a destination, the paths permitted are those defined by the routing algorithm.

HPI Coherence Protocol

In one embodiment, the HPI Coherence Protocol is included in layer 1520*a,b* is to support agents caching lines of data from memory. An agent wishing to cache memory data may use the coherence protocol to read the line of data to load into its cache. An agent wishing to modify a line of data in its cache may use the coherence protocol to acquire ownership of the line before modifying the data. After modifying a line, an agent may follow protocol requirements of keeping it in its cache until it either writes the line back to memory or includes the line in a response to an external request. Lastly, an agent may fulfill external requests to invalidate a line in its cache. The protocol ensures coherency of the data by dictating the rules all caching agents may follow. It also provides the means for agents without caches to coherently read and write memory data.

Two conditions may be enforced to support transactions utilizing the HPI Coherence Protocol. First, the protocol maintains data consistency, as an example on a per-address basis, among data in agents' caches and between those data and the data in memory. Informally, data consistency may refer to each valid line of data in an agent's cache representing a most up-to-date value of the data and data transmitted in a coherence protocol packet represents the most up-to-date value of the data at the time it was sent. When no valid copy of the data exists in caches or in transmission, the protocol may ensure the most up-to-date value of the data resides in memory. Second, the protocol provides well-defined commitment points for requests. Commitment points for reads may indicate when the data is usable; and for writes they may indicate when the written data is globally observable and will be loaded by subsequent reads. The protocol may support these commitment points for both cacheable and uncacheable (UC) requests in the coherent memory space.

The HPI Coherence Protocol also may ensure the forward progress of coherence requests made by an agent to an address in the coherent memory space. Certainly, transactions may eventually be satisfied and retired for proper system operation. The HPI Coherence Protocol, in some embodiments, may have no notion of retry for resolving resource allocation conflicts. Thus, the protocol itself may be defined to contain no circular resource dependencies, and implementations may take care in their designs not to introduce dependencies that can result in deadlocks. Additionally, the protocol may indicate where designs are able to provide fair access to protocol resources.

Logically, the HPI Coherence Protocol, in one embodiment, consists of three items: coherence (or caching) agents, home agents, and the HPI interconnect fabric connecting the agents. Coherence agents and home agents work together to achieve data consistency by exchanging messages over the interconnect. The link layer 1510*a,b* and its related description provides the details of the interconnect fabric including how it adheres to the coherence protocol's requirements, discussed herein. (It may be noted that the division into coherence agents and home agents is for clarity. A design may contain multiple agents of both types within a socket or even combine agents behaviors into a single design unit.).

In one embodiment, HPI does not pre-allocate resources of a Home Agent. Here, a Receiving Agent receiving a request allocates resource to process it. An Agent sending a request allocates resources for responses. In this scenario, HPI may follow two general rules regarding resource allocation. First, an agent receiving a request may be responsible for allocating the resource to process it. Second, an agent generating a request may be responsible for allocating resources to process responses to the request.

For allocation of resources may also extend to HTID (along with RNID/RTID) in snoop requests. The potential reduction of using a home agent and forward responses to support responses to Home Agent (and data forwarding to requesting agent).

In one embodiment, home agent resources are also not pre-allocated in snoop requests and forward responses to support responses to the home agent (and data forwarding to the requesting agent.

In one embodiment, there is no pre-allocation of Home resources Ability to send CmpO "early", before Home Agent is finished processing request, when it is safe for requesting agent to reuse its RTID resource. General handling of snoops with similar RNID/RTID in system also part of protocol.

In one embodiment, conflict resolution is performed using an ordered response channel. A Coherence Agent uses RspCnflt as request for a Home Agent to send a FwdCnfltO, which will be ordered with the CmpO (if any already scheduled) for the Coherence Agent's conflicting request.

In one embodiment, HPI supports conflict resolution via an ordered response channel. A Coherence Agent using information from snoop to aid in processing FwdCnfltO, which has no "type" information and no RTID for forwarding data to requesting agent.

In one embodiment, a Coherence Agent blocks forwards for writeback requests to maintain data consistency. But it also allows Coherence Agent to use a writeback request to commit uncacheable (UC) data before processing forward and allows the Coherence Agent to writeback partial cache lines instead of protocol supporting a partial implicit writeback for forwards.

In one embodiment, a read invalidate (RdInv) request accepting Exclusive-state data is supported. Semantics of uncacheable (UC) reads include flushing modified data to memory. Some architecture, however, allowed forwarding M data to invalidating reads, which forced the requesting agent to clean the line if it received M data. The RdInv simplifies the flow but it does not allow E data to be forwarded.

In one embodiment, HPI support an InvItoM to IODC functionality. An InvItoM requests exclusive ownership of a cache line without receiving data and with the intent of performing a writeback soon afterward. A required cache state may be an M state, and E state, or either.

In one embodiment, HPI supports a WbFlush for persistent memory flush. An embodiment of a WbFlush is illustrated below. It may be sent as a result of a persistent commit. May flush write to persistent memory.

In one embodiment, HPI supports additional operations, such as SnpF for "fanout" snoops generated by the Routing Layer. Some architectures don't have explicit support for fanout snoops. Here, a HPI Home agent generates single "fanout" snoop request and, in response, the Routing Layer generates snoops to all peer agents in the "fanout cone." Home agent may expect snoop responses from each of the agent Sections.

In one embodiment, HPI supports additional operations, such as SnpF for "fanout" snoops generated by the Routing Layer. Some architectures don't have explicit support for fanout snoops. Here, a HPI Home agent generates single "fanout" snoop request and, in response, the Routing Layer generates snoops to all peer agents in the "fanout cone". Home agent may expect snoop responses from each of the agent Sections.

In one embodiment, HPI supports an explicit writeback with cache-push hint (WbPushMtol). In one embodiment, a Coherence Agent writes back modified data with a hint to Home Agent that it may push the modified data to a "local" cache, storing in M state, without writing the data to memory.

In one embodiment, a Coherence Agent may keep F state when forwarding shared data. In on example, a Coherence Agent with F state that receives a "sharing" snoop or forward after such a snoop may keep the F state while sending S state to the requesting agent.

In one embodiment, protocol tables may be nested by having one table refer to another sub-table in the "next state" columns, and the nested table can have additional or finer-grained guards to specify which rows (behaviors) are permitted.

In one embodiment, Protocol tables use row spanning to indicate equally permissible behaviors (rows) instead of adding "Bias" bits to select among behaviors.

In one embodiment, action tables are organized for use as functionality engine for BFM (validation environment tool) rather than having BFM team create their own BFM engine based upon their interpretation.

HPI Non-Coherent Protocol

In one embodiment, HPI supports non-coherent transactions. As an example, a non-coherent transaction is referred to as one that does not participate in the HPI coherency protocol. Non-coherent transactions comprise requests and their corresponding completions. For some special transactions, a broadcast mechanism.

The foregoing outlines features of one or more embodiments of the subject matter disclosed herein. These embodiments are provided to enable a person having ordinary skill in the art (PHOSITA) to better understand various aspects of the present disclosure. Certain well-understood terms, as well as underlying technologies and/or standards may be referenced without being described in detail. It is anticipated that the PHOSITA will possess or have access to background knowledge or information in those technologies and standards sufficient to practice the teachings of the present specification.

The PHOSITA will appreciate that they may readily use the present disclosure as a basis for designing or modifying other processes, structures, or variations for carrying out the same purposes and/or achieving the same advantages of the embodiments introduced herein. The PHOSITA will also recognize that such equivalent constructions do not depart from the spirit and scope of the present disclosure, and that they may make various changes, substitutions, and alterations herein without departing from the spirit and scope of the present disclosure.

In the foregoing description, certain aspects of some or all embodiments are described in greater detail than is strictly necessary for practicing the appended claims. These details are provided by way of non-limiting example only, for the purpose of providing context and illustration of the disclosed embodiments. Such details should not be understood to be required, and should not be "read into" the claims as limitations. The phrase may refer to "an embodiment" or "embodiments." These phrases, and any other references to embodiments, should be understood broadly to refer to any combination of one or more embodiments. Furthermore, the several features disclosed in a particular "embodiment" could just as well be spread across multiple embodiments. For example, if features 1 and 2 are disclosed in "an embodiment," embodiment A may have feature 1 but lack feature 2, while embodiment B may have feature 2 but lack feature 1.

This specification may provide illustrations in a block diagram format, wherein certain features are disclosed in separate blocks. These should be understood broadly to disclose how various features interoperate, but are not intended to imply that those features must necessarily be embodied in separate hardware or software. Furthermore, where a single block discloses more than one feature in the same block, those features need not necessarily be embodied in the same hardware and/or software. For example, a computer "memory" could in some circumstances be distributed or mapped between multiple levels of cache or local memory, main memory, battery-backed volatile memory, and various forms of persistent memory such as a hard disk, storage server, optical disk, tape drive, or similar. In certain embodiments, some of the components may be omitted or consolidated. In a general sense, the arrangements depicted in the figures may be more logical in their representations, whereas a physical architecture may include various permutations, combinations, and/or hybrids of these elements. Countless possible design configurations can be used to achieve the operational objectives outlined herein. Accordingly, the associated infrastructure has a myriad of substitute arrangements, design choices, device possibilities, hardware configurations, software implementations, and equipment options.

References may be made herein to a computer-readable medium, which may be a tangible and non-transitory computer-readable medium. As used in this specification and throughout the claims, a "computer-readable medium" should be understood to include one or more computer-readable mediums of the same or different types. A computer-readable medium may include, by way of non-limiting example, an optical drive (e.g., CD/DVD/Blu-Ray), a hard drive, a solid-state drive, a flash memory, or other nonvolatile medium. A computer-readable medium could also include a medium such as a read-only memory (ROM), an FPGA or ASIC configured to carry out the desired instructions, stored instructions for programming an FPGA or ASIC to carry out the desired instructions, an intellectual property (IP) block that can be integrated in hardware into other circuits, or instructions encoded directly into hardware or microcode on a processor such as a microprocessor, digital signal processor (DSP), microcontroller, or in any other suitable component, device, element, or object where appropriate and based on particular needs. A nontransitory storage medium herein is expressly intended to include any nontransitory special-purpose or programmable hardware configured to provide the disclosed operations, or to cause a processor to perform the disclosed operations.

Various elements may be "communicatively," "electrically," "mechanically," or otherwise "coupled" to one another throughout this specification and the claims. Such coupling may be a direct, point-to-point coupling, or may include intermediary devices. For example, two devices may be communicatively coupled to one another via a controller that facilitates the communication. Devices may be electrically coupled to one another via intermediary devices such as signal boosters, voltage dividers, or buffers. Mechanically-coupled devices may be indirectly mechanically coupled.

Any "module" or "engine" disclosed herein may refer to or include software, a software stack, a combination of hardware, firmware, and/or software, a circuit configured to carry out the function of the engine or module, or any computer-readable medium as disclosed above. Such modules or engines may, in appropriate circumstances, be provided on or in conjunction with a hardware platform, which may include hardware compute resources such as a processor, memory, storage, interconnects, networks and network interfaces, accelerators, or other suitable hardware. Such a hardware platform may be provided as a single monolithic device (e.g., in a PC form factor), or with some or part of the function being distributed (e.g., a "composite node" in a high-end data center, where compute, memory, storage, and other resources may be dynamically allocated and need not be local to one another).

There may be disclosed herein flow charts, signal flow diagram, or other illustrations showing operations being performed in a particular order. Unless otherwise expressly noted, or unless required in a particular context, the order should be understood to be a non-limiting example only. Furthermore, in cases where one operation is shown to follow another, other intervening operations may also occur, which may be related or unrelated. Some operations may also be performed simultaneously or in parallel. In cases where an operation is said to be "based on" or "according to" another item or operation, this should be understood to imply that the operation is based at least partly on or according at least partly to the other item or operation. This should not be construed to imply that the operation is based solely or exclusively on, or solely or exclusively according to the item or operation.

All or part of any hardware element disclosed herein may readily be provided in a system-on-a-chip (SoC), including a central processing unit (CPU) package. An SoC represents an integrated circuit (IC) that integrates components of a computer or other electronic system into a single chip. Thus, for example, client devices or server devices may be provided, in whole or in part, in an SoC. The SoC may contain digital, analog, mixed-signal, and radio frequency functions, all of which may be provided on a single chip substrate. Other embodiments may include a multichip module (MCM), with a plurality of chips located within a single electronic package and configured to interact closely with each other through the electronic package.

In a general sense, any suitably-configured circuit or processor can execute any type of instructions associated with the data to achieve the operations detailed herein. Any processor disclosed herein could transform an element or an article (for example, data) from one state or thing to another state or thing. Furthermore, the information being tracked, sent, received, or stored in a processor could be provided in any database, register, table, cache, queue, control list, or storage structure, based on particular needs and implementations, all of which could be referenced in any suitable timeframe. Any of the memory or storage elements disclosed herein, should be construed as being encompassed within the broad terms "memory" and "storage," as appropriate.

Computer program logic implementing all or part of the functionality described herein is embodied in various forms, including, but in no way limited to, a source code form, a computer executable form, machine instructions or microcode, programmable hardware, and various intermediate forms (for example, forms generated by an assembler, compiler, linker, or locator). In an example, source code includes a series of computer program instructions implemented in various programming languages, such as an object code, an assembly language, or a high-level language such as OpenCL, FORTRAN, C, C++, JAVA, or HTML for use with various operating systems or operating environments, or in hardware description languages such as Spice, Verilog, and VHDL. The source code may define and use various data structures and communication messages. The source code may be in a computer executable form (e.g., via an interpreter), or the source code may be converted (e.g., via a translator, assembler, or compiler) into a computer executable form, or converted to an intermediate form such as byte code. Where appropriate, any of the foregoing may be used to build or describe appropriate discrete or integrated circuits, whether sequential, combinatorial, state machines, or otherwise.

In one example embodiment, any number of electrical circuits of the FIGURES may be implemented on a board of an associated electronic device. The board can be a general circuit board that can hold various components of the internal electronic system of the electronic device and, further, provide connectors for other peripherals. Any suitable processor and memory can be suitably coupled to the board based on particular configuration needs, processing demands, and computing designs. Note that with the numerous examples provided herein, interaction may be described in terms of two, three, four, or more electrical components. However, this has been done for purposes of clarity and example only. It should be appreciated that the system can be consolidated or reconfigured in any suitable manner. Along similar design alternatives, any of the illustrated components, modules, and elements of the FIGURES may be combined in various possible configurations, all of which are within the broad scope of this specification.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 (pre-AIA) or paragraph (f) of the same section (post-AIA), as it exists on the date of the filing hereof unless the words "means for" or "steps for" are specifically used in the particular claims; and (b) does not intend, by any statement in the specification, to limit this disclosure in any way that is not otherwise expressly reflected in the appended claims.

EXAMPLE IMPLEMENTATIONS

The following examples are provided by way of illustration.

Example 1 includes an apparatus, comprising: a plurality of interconnects to communicatively couple an accelerator device to a host device; and an address translation module (ATM) to provide address mapping between host-physical address (HPA) and guest-physical address (GPA) spaces for the accelerator device, wherein the plurality of devices share a common GPA domain and wherein address mapping is to be associated with only one of the plurality of interconnects.

Example 2 includes the apparatus of example 1, wherein the ATM is an address translation unit (ATU).

Example 3 includes the apparatus of example 2, wherein the ATU is a distributed ATU.

Example 4 includes the apparatus of example 2, wherein each of the plurality of interconnects is configured to walk a memory page.

Example 5 includes the apparatus of example 1, wherein the ATM is an address translation cache (ATC).

Example 6 includes the apparatus of example 5, wherein the ATC is a distributed ATC.

Example 7 includes the apparatus of example 5, wherein only the interconnect associated with the address mapping is to walk a memory page.

Example 8 includes the apparatus of example 1, wherein the plurality of interconnects are of a single species.

Example 9 includes the apparatus of example 8, wherein the species is a peripheral component interconnect express (PCIe) bus.

Example 10 includes the apparatus of example 1, wherein the plurality of interconnects are of at least two species.

Example 11 includes the apparatus of example 10, wherein the at least two species comprise a peripheral component interconnect express (PCIe) bus and an ultra-path interconnect (UPI) bus.

Example 12 includes the apparatus of example 1, wherein the accelerator device comprises a plurality of accelerator devices linked to a single address domain.

Example 13 includes the apparatus of example 1, wherein the ATM is further to provide nested GPA to guest virtual address (GVA) translation.

Example 14 includes an intellectual property (IP) block to provide the apparatus of any of examples 1-13.

Example 15 includes an accelerator device comprising the apparatus of any of examples 1-13.

Example 16 includes the accelerator device of example 15, wherein the accelerator device comprises a field-programmable gate array (FPGA).

Example 17 includes the accelerator device of example 15, wherein the accelerator device comprises an application-specific integrated circuit (ASIC).

Example 18 includes the accelerator device of example 15, wherein the accelerator device comprises a co-processor.

Example 19 includes a computing system comprising the accelerator of example 15 and a host processor, wherein the host processor is to at least partly disable an on-die address translation unit.

Example 20 includes the computing system of example 19, wherein the processor is to fully disable the address translation unit.

Example 21 includes the computing system of example 19, wherein the processor is to disable all but one line of the on-die address translation unit.

Example 22 includes one or more tangible, non-transitory storage mediums having stored thereon instructions to: provide a plurality of interconnects to communicatively couple an accelerator device to a host device; and provide an address translation module (ATM) to provide address mapping between host-physical address (HPA) and guest-physical address (GPA) spaces for the accelerator device, wherein the plurality of devices share a common GPA domain and wherein address mapping is to be associated with only one of the plurality of interconnects.

Example 23 includes the one or more tangible, non-transitory storage mediums of example 22, wherein the ATM is an address translation unit (ATU).

Example 24 includes the one or more tangible, non-transitory storage mediums of example 23, wherein the ATU is a distributed ATU.

Example 25 includes the one or more tangible, non-transitory storage mediums of example 23, wherein each of the plurality of interconnects is configured to walk a memory page.

Example 26 includes the one or more tangible, non-transitory storage mediums of example 22, wherein the ATM is an address translation cache (ATC).

Example 27 includes the one or more tangible, non-transitory storage mediums of example 26, wherein the ATC is a distributed ATC.

Example 28 includes the one or more tangible, non-transitory storage mediums of example 26, wherein only the interconnect associated with the address mapping is to walk a memory page.

Example 29 includes the one or more tangible, non-transitory storage mediums of example 22, wherein the plurality of interconnects are of a single species.

Example 30 includes the one or more tangible, non-transitory storage mediums of example 29, wherein the species is a peripheral component interconnect express (PCIe) bus.

Example 31 includes the one or more tangible, non-transitory storage mediums of example 22, wherein the plurality of interconnects are of at least two species.

Example 32 includes the one or more tangible, non-transitory storage mediums of example 31, wherein the at least two species comprise a peripheral component interconnect express (PCIe) bus and an ultra-path interconnect (UPI) bus.

Example 33 includes the one or more tangible, non-transitory storage mediums of example 22, wherein the accelerator device comprises a plurality of accelerator devices linked to a single address domain.

Example 34 includes the one or more tangible, non-transitory storage mediums of example 22, wherein the ATM is further to provide nested GPA to guest virtual address (GVA) translation.

Example 35 includes the one or more tangible, non-transitory storage mediums of any of examples 22-34, wherein the instructions comprise instructions to provide an intellectual property (IP) block.

Example 36 includes the one or more tangible, non-transitory storage mediums of any of examples 22-34, wherein the instructions comprise instructions to provide a field-programmable gate array (FPGA).

Example 37 includes the one or more tangible, non-transitory storage mediums of any of examples 22-34, wherein the instructions comprise instructions to provide an application-specific integrated circuit (ASIC).

Example 38 includes a computer-implemented method of providing a single address domain to a plurality of interconnects, comprising: communicatively coupling the plurality of interconnects to an accelerator device and a host device; and providing an address translation module (ATM) to provide address mapping between host-physical address (HPA) and guest-physical address (GPA) spaces for the accelerator device, wherein the plurality of devices share a common GPA domain and wherein address mapping is to be associated with only one of the plurality of interconnects.

Example 39 includes the method of example 38, wherein the ATM is an address translation unit (ATU).

Example 40 includes the method of example 39, wherein the ATU is a distributed ATU.

Example 41 includes the method of example 39, wherein each of the plurality of interconnects is configured to walk a memory page.

Example 42 includes the method of example 38, wherein the ATM is an address translation cache (ATC).

Example 43 includes the method of example 42, wherein the ATC is a distributed ATC.

Example 44 includes the method of example 42, wherein only the interconnect associated with the address mapping is to walk a memory page.

Example 45 includes the method of example 38, wherein the plurality of interconnects are of a single species.

Example 46 includes the method of example 42, wherein the species is a peripheral component interconnect express (PCIe) bus.

Example 47 includes the method of example 38, wherein the plurality of interconnects are of at least two species.

Example 48 includes the method of example 38, wherein the at least two species comprise a peripheral component interconnect express (PCIe) bus and an ultra-path interconnect (UPI) bus.

Example 49 includes the method of example 38, wherein the accelerator device comprises a plurality of accelerator devices linked to a single address domain.

Example 50 includes the method of example 38, wherein the ATM is further to provide nested GPA to guest virtual address (GVA) translation.

Example 51 includes an apparatus comprising means for performing the method of any of examples 38-50.

Example 52 includes the apparatus of example 51, wherein the means comprise an intellectual property (IP) block.

Example 53 includes an accelerator device comprising the apparatus of example 51.

Example 54 includes the accelerator device of example 53, wherein the accelerator device comprises a field-programmable gate array (FPGA).

Example 55 includes the accelerator device of example 53, wherein the accelerator device comprises an application-specific integrated circuit (ASIC).

Example 56 includes the accelerator device of example 53, wherein the accelerator device comprises a co-processor.

Example 57 includes a computing system comprising the accelerator of example 53 and a host processor, wherein the host processor is to at least partly disable an on-die address translation unit.

Example 58 includes the computing system of example 57, wherein the processor is to fully disable the address translation unit.

Example 59 includes the computing system of example 57, wherein the processor is to disable all but one line of the on-die address translation unit.

What is claimed is:

1. An apparatus, comprising:
   a plurality of physical interconnects to communicatively couple an accelerator device to a host device, wherein the host device is to execute software; and
   an address translation module (ATM) to provide address mapping between host-physical address (HPA) and guest-physical address (GPA) spaces for the accelerator device, wherein the plurality of physical interconnects share a common GPA domain and wherein address mapping is to be associated with only one of the plurality of physical interconnects to present the plurality of physical interconnects as a single link to the software.

2. The apparatus of claim 1, wherein the ATM is an address translation unit (ATU).

3. The apparatus of claim 2, wherein the ATU is a distributed ATU.

4. The apparatus of claim 2, wherein each of the plurality of physical interconnects is configured to walk a memory page.

5. The apparatus of claim 1, wherein the ATM is an address translation cache (ATC).

6. The apparatus of claim 5, wherein the ATC is a distributed ATC.

7. The apparatus of claim 5, wherein a respective one of the plurality of physical interconnects is compliant with a protocol, and only the protocol of the respective interconnect associated with the address mapping is allowed to trigger a walk of a memory page.

8. The apparatus of claim 1, wherein the plurality of physical interconnects are of a single species.

9. The apparatus of claim 8, wherein the species is a peripheral component interconnect express (PCIe) bus.

10. The apparatus of claim 1, wherein the plurality of physical interconnects are of at least two species.

11. The apparatus of claim 10, wherein one of the at least two species comprises a bus compatible with a Peripheral Component Interconnect Express (PCIe)-based protocol.

12. The apparatus of claim 1, wherein the accelerator device comprises a plurality of accelerator devices linked to a single address domain.

13. The apparatus of claim 1, wherein the ATM is further to provide nested GPA to guest virtual address (GVA) translation.

14. An intellectual property (IP) block to provide the apparatus of claim 1.

15. An accelerator device comprising the apparatus of claim 1.

16. The accelerator device of claim 15, wherein the accelerator device comprises a field-programmable gate array (FPGA).

17. The accelerator device of claim 15, wherein the accelerator device comprises an application-specific integrated circuit (ASIC).

18. The accelerator device of claim 15, wherein the accelerator device comprises a co-processor.

19. A computing system comprising the accelerator of claim 15 and a host processor, wherein the host processor is to at least partly disable an on-die address translation unit.

20. The computing system of claim 19, wherein the processor is to fully disable the address translation unit.

21. The computing system of claim 19, wherein the processor is to disable all but one line of the on-die address translation unit.

22. A computer-implemented method of providing a single address domain to a plurality of interconnects, comprising:
communicatively coupling the plurality of interconnects to an accelerator device and a host device, wherein the host device is to execute software; and
providing an address translation module (ATM) to provide address mapping between host-physical address (HPA) and guest-physical address (GPA) spaces for the accelerator device, wherein the plurality of interconnects share a common GPA domain and wherein address mapping is to be associated with only one of the plurality of interconnects to present the plurality of interconnects as a single link to software.

23. A system comprising:
a first device;
a second device coupled to the first device by a plurality of physical links;
an address translation module (ATM) to provide address mapping between host-physical address (HPA) and guest-physical address (GPA) spaces for the first device, wherein the plurality of devices share a common GPA domain and wherein address mapping is to be associated with only one of the plurality of physical links; and
system software to view the plurality of physical links as a single link coupling the first device to the second device based on the address mapping.

24. The system of claim 23, wherein the first device comprises an accelerator device.

25. The system of claim 24, wherein the second device comprises a host processor.

26. The system of claim 23, wherein the plurality of physical links comprises a first link compliant with a first interconnect protocol and a second link compliant with a different second interconnect protocol.

* * * * *